US012652192B2

(12) United States Patent
Sarkar et al.

(10) Patent No.: US 12,652,192 B2
(45) Date of Patent: Jun. 9, 2026

(54) INDEPENDENT DATASTORE IN A NETWORK ROUTING ENVIRONMENT

(71) Applicant: Arrcus Inc., San Jose, CA (US)

(72) Inventors: Pushpasis Sarkar, Bangalore (IN); Keyur Patel, San Jose, CA (US); Derek Man-Kit Yeung, Fremont, CA (US); Alpesh Patel, San Ramon, CA (US); Lawrence Rolfe Kreeger, Fremont, CA (US)

(73) Assignee: Arrcus Inc., San Jose, CA (US)

( * ) Notice: Subject to any disclaimer, the term of this patent is extended or adjusted under 35 U.S.C. 154(b) by 233 days.

(21) Appl. No.: 18/322,340

(22) Filed: May 23, 2023

(65) Prior Publication Data

US 2023/0367658 A1     Nov. 16, 2023

Related U.S. Application Data

(63) Continuation of application No. 17/469,609, filed on Sep. 8, 2021, now Pat. No. 11,693,716, which is a
(Continued)

(51) Int. Cl.
| | |
|---|---|
| *G06F 15/16* | (2006.01) |
| *G06F 9/455* | (2018.01) |
(Continued)

(52) U.S. Cl.
CPC .......... *H04L 12/44* (2013.01); *G06F 9/45558* (2013.01); *G06F 9/4881* (2013.01);
(Continued)

(58) Field of Classification Search
CPC ..... H04L 45/00; H04L 67/55; H04L 67/1097; G06F 9/542; G06F 9/278
(Continued)

(56) References Cited

U.S. PATENT DOCUMENTS

| | | |
|---|---|---|
| 5,873,076 A | 2/1999 | Barr |
| 6,874,010 B1 | 3/2005 | Sargent |
(Continued)

FOREIGN PATENT DOCUMENTS

| | | |
|---|---|---|
| CA | 2279845 A1 | 5/1998 |
| CN | 101848236 A | 9/2010 |
(Continued)

OTHER PUBLICATIONS

Cisco Documentation: "Internet Engineering Task Force (IETF) Network Working Group draft-ietf-idr-bgp4-24.txt document.", Apr. 28, 2011 (Apr. 28, 2011), pp. 1-166, XP093187495, Retrieved from the Internet: URL:https://www.cisco.com/c/en/US/td/docs/routers/xrl2000/software/xrl 2k_r4-1/routing/configuration/guide/routing_cg41 xrl 2k_chapterI .pdf.
(Continued)

*Primary Examiner* — Hamza N Algibhah
(74) *Attorney, Agent, or Firm* — David R. Stevens; Stevens Law Group

(57) ABSTRACT

Systems, methods, and devices for offloading network data to a datastore. A system includes a publisher device in a network computing environment. The system includes a subscriber device in the network computing environment. The system includes a datastore independent of the publisher device and the subscriber device, the datastore comprising one or more processors in a processing platform configurable to execute instructions stored in non-transitory computer readable storage media. The instructions includes receiving data from the publisher device. The instructions include storing the data across one or more of a plurality of shared storage devices. The instructions include providing the data to the subscriber device.

20 Claims, 18 Drawing Sheets

Related U.S. Application Data continuation of application No. 16/549,315, filed on Aug. 23, 2019, now Pat. No. 11,140,070.

(60) Provisional application No. 62/722,003, filed on Aug. 23, 2018.

(51) Int. Cl.

| | |
|---|---|
| *G06F 9/48* | (2006.01) |
| *G06F 9/54* | (2006.01) |
| *G06F 16/22* | (2019.01) |
| *G06F 16/23* | (2019.01) |
| *G06F 16/27* | (2019.01) |
| *H04L 9/40* | (2022.01) |
| *H04L 12/28* | (2006.01) |
| *H04L 12/44* | (2006.01) |
| *H04L 12/46* | (2006.01) |
| *H04L 12/66* | (2006.01) |
| *H04L 29/06* | (2006.01) |
| *H04L 45/00* | (2022.01) |
| *H04L 45/02* | (2022.01) |
| *H04L 45/24* | (2022.01) |
| *H04L 45/28* | (2022.01) |
| *H04L 45/48* | (2022.01) |
| *H04L 45/50* | (2022.01) |
| *H04L 45/586* | (2022.01) |
| *H04L 45/745* | (2022.01) |
| *H04L 47/125* | (2022.01) |
| *H04L 67/1097* | (2022.01) |
| *H04L 67/55* | (2022.01) |
| *H04L 49/25* | (2022.01) |

(52) U.S. Cl.
CPC ............... *G06F 9/54* (2013.01); *G06F 9/542* (2013.01); *G06F 16/2272* (2019.01); *G06F 16/2379* (2019.01); *G06F 16/27* (2019.01); *G06F 16/278* (2019.01); *H04L 12/2881* (2013.01); *H04L 12/462* (2013.01); *H04L 12/4633* (2013.01); *H04L 12/4641* (2013.01); *H04L 12/66* (2013.01); *H04L 45/02* (2013.01); *H04L 45/08* (2013.01); *H04L 45/22* (2013.01); *H04L 45/24* (2013.01); *H04L 45/26* (2013.01); *H04L 45/28* (2013.01); *H04L 45/48* (2013.01); *H04L 45/50* (2013.01); *H04L 45/586* (2013.01); *H04L 45/66* (2013.01); *H04L 45/745* (2013.01); *H04L 47/125* (2013.01); *H04L 63/0272* (2013.01); *H04L 67/1097* (2013.01); *H04L 67/55* (2022.05); *G06F 2009/45595* (2013.01); *H04L 2012/4629* (2013.01); *H04L 49/25* (2013.01)

(58) Field of Classification Search
USPC ......................................................... 709/213
See application file for complete search history.

(56) References Cited

U.S. PATENT DOCUMENTS

| | | | |
|---|---|---|---|
| 6,879,594 B1 | 4/2005 | Lee | |
| 6,970,561 B1 | 11/2005 | Obana | |
| 7,274,869 B1 | 9/2007 | Pan | |
| 7,593,320 B1 | 9/2009 | Cohen et al. | |
| 7,945,813 B1 | 5/2011 | Watson | |
| 7,970,918 B2 | 6/2011 | Thompson et al. | |
| 8,060,533 B1 | 11/2011 | Wheeler | |
| 8,537,840 B1 * | 9/2013 | Raszuk | H04L 45/12 |
| | | | 396/389 |
| 8,756,656 B1 | 6/2014 | Hartmann | |
| 8,849,955 B2 | 9/2014 | Prahlad | |
| 9,288,101 B1 | 3/2016 | Dalal | |
| 9,330,154 B2 | 5/2016 | Di | |
| 9,331,940 B2 | 5/2016 | Balus | |
| 9,507,856 B1 * | 11/2016 | Camplejohn | G06F 16/00 |
| 9,544,185 B1 | 1/2017 | Yadav | |
| 9,652,483 B1 | 5/2017 | Cao et al. | |
| 10,200,274 B1 | 2/2019 | Suryanarayana | |
| 10,530,873 B1 | 1/2020 | Arya | |
| 10,785,296 B1 * | 9/2020 | Allison | H04L 67/1095 |
| 10,931,530 B1 | 2/2021 | Rzehak | |
| 11,074,300 B1 | 7/2021 | Falco | |
| 2003/0012133 A1 | 1/2003 | Jappinen | |
| 2003/0012193 A1 | 1/2003 | Novaes | |
| 2004/0003064 A1 | 1/2004 | Astley | |
| 2004/0264460 A1 | 12/2004 | Yoshimoto | |
| 2005/0021622 A1 * | 1/2005 | Cullen | H04L 69/329 |
| | | | 709/204 |
| 2006/0136256 A1 | 6/2006 | Roots | |
| 2006/0233322 A1 | 10/2006 | Allman | |
| 2007/0074150 A1 | 3/2007 | Jolfaei et al. | |
| 2007/0086429 A1 | 4/2007 | Lawrence | |
| 2007/0091796 A1 * | 4/2007 | Filsfils | H04L 45/28 |
| | | | 370/228 |
| 2007/0104192 A1 | 5/2007 | Yoon | |
| 2007/0214280 A1 * | 9/2007 | Patel | H04L 45/124 |
| | | | 709/239 |
| 2007/0291773 A1 | 12/2007 | Khan | |
| 2009/0043911 A1 | 2/2009 | Flammer | |
| 2009/0257439 A1 * | 10/2009 | Xu | H04L 45/033 |
| | | | 370/389 |
| 2009/0296579 A1 | 12/2009 | Dharwadkar | |
| 2010/0046531 A1 | 2/2010 | Louati | |
| 2010/0061366 A1 | 3/2010 | DelRegno | |
| 2010/0125574 A1 | 5/2010 | Navas | |
| 2010/0189115 A1 | 7/2010 | Kitada | |
| 2010/0189117 A1 | 7/2010 | Gowda et al. | |
| 2010/0211781 A1 | 8/2010 | Auradkar et al. | |
| 2010/0250867 A1 * | 9/2010 | Bettger | G06F 3/067 |
| | | | 711/147 |
| 2010/0293235 A1 | 11/2010 | Cadoret | |
| 2011/0004913 A1 | 1/2011 | Nagarajan | |
| 2011/0320550 A1 * | 12/2011 | Lawson | H04L 51/04 |
| | | | 709/206 |
| 2012/0201124 A1 | 8/2012 | Marques | |
| 2012/0213218 A1 | 8/2012 | Yilmaz | |
| 2012/0281700 A1 | 11/2012 | Koganti | |
| 2012/0300782 A1 | 11/2012 | Farinacci | |
| 2013/0028073 A1 | 1/2013 | Tatipamula | |
| 2013/0054763 A1 * | 2/2013 | Van der Merwe | H04W 8/12 |
| | | | 709/220 |
| 2013/0188521 A1 | 7/2013 | Jain | |
| 2013/0286846 A1 | 10/2013 | Atlas et al. | |
| 2013/0301522 A1 * | 11/2013 | Krishna | H04L 61/2517 |
| | | | 370/328 |
| 2013/0329584 A1 | 12/2013 | Ghose et al. | |
| 2013/0336164 A1 | 12/2013 | Yang | |
| 2014/0044126 A1 | 2/2014 | Sabhanatarajan et al. | |
| 2014/0075184 A1 | 3/2014 | Gorbach | |
| 2014/0092901 A1 | 4/2014 | Kapadia | |
| 2014/0112122 A1 | 4/2014 | Kapadia et al. | |
| 2014/0188840 A1 | 7/2014 | Agarwal | |
| 2014/0207991 A1 | 7/2014 | Kaushik | |
| 2014/0233399 A1 | 8/2014 | Mann | |
| 2014/0258485 A1 | 9/2014 | Yang | |
| 2014/0317616 A1 | 10/2014 | Chu | |
| 2014/0366037 A1 | 12/2014 | Berretta | |
| 2014/0372748 A1 | 12/2014 | Dixon et al. | |
| 2015/0010002 A1 | 1/2015 | Duda | |
| 2015/0124590 A1 | 5/2015 | Chu | |
| 2015/0172172 A1 | 6/2015 | DeCusatis | |
| 2015/0188753 A1 | 7/2015 | Anumala et al. | |
| 2015/0188808 A1 | 7/2015 | Ghanwani | |
| 2015/0195136 A1 | 7/2015 | Mermoud | |
| 2015/0195368 A1 * | 7/2015 | Bandyopadhyay | |
| | | | H04L 43/0805 |
| | | | 709/219 |
| 2015/0199415 A1 | 7/2015 | Bourbonnais | |
| 2015/0263899 A1 | 9/2015 | Tubaltsev | |

(56) References Cited

U.S. PATENT DOCUMENTS

| | | | |
|---|---|---|---|
| 2015/0304206 A1 | 10/2015 | Filsfils et al. | |
| 2015/0312134 A1 | 10/2015 | Kapadia | |
| 2015/0355946 A1 | 12/2015 | Kang | |
| 2015/0370644 A1 | 12/2015 | Graefe | |
| 2016/0014025 A1 | 1/2016 | Wang | |
| 2016/0028613 A1 | 1/2016 | Haramaty | |
| 2016/0065498 A1 | 3/2016 | Harper | |
| 2016/0112821 A1 | 4/2016 | Raleigh | |
| 2016/0134116 A1* | 5/2016 | Carlson | H02J 13/00007 |
| | | | 709/206 |
| 2016/0142313 A1 | 5/2016 | Devireddy et al. | |
| 2016/0196320 A1 | 7/2016 | Borowiec | |
| 2016/0218917 A1* | 7/2016 | Zhang | H04L 45/42 |
| 2016/0234326 A1* | 8/2016 | Camplejohn | H04L 51/10 |
| 2016/0248658 A1 | 8/2016 | Patel et al. | |
| 2016/0248663 A1* | 8/2016 | Patel | H04L 45/24 |
| 2016/0277210 A1 | 9/2016 | Lin et al. | |
| 2016/0294608 A1 | 10/2016 | Biswal | |
| 2016/0321341 A1* | 11/2016 | Ramamurthi | H04L 67/568 |
| 2016/0337231 A1 | 11/2016 | Dixon | |
| 2016/0337464 A1* | 11/2016 | Eriksson | H04L 67/568 |
| 2016/0352619 A1 | 12/2016 | Gattani | |
| 2016/0357778 A1 | 12/2016 | MacKenzie et al. | |
| 2017/0032011 A1 | 2/2017 | Song | |
| 2017/0041239 A1 | 2/2017 | Goldenberg | |
| 2017/0109369 A1 | 4/2017 | Feng | |
| 2017/0126486 A1 | 5/2017 | Prieto | |
| 2017/0155542 A1 | 6/2017 | Fang | |
| 2017/0171057 A1 | 6/2017 | Dong et al. | |
| 2017/0180797 A1 | 6/2017 | Splaine | |
| 2017/0244657 A1* | 8/2017 | Baldwin | H04L 51/212 |
| 2017/0285882 A1 | 10/2017 | Hidinger | |
| 2017/0310548 A1 | 10/2017 | Jailani | |
| 2017/0331669 A1 | 11/2017 | Ganesh | |
| 2018/0034665 A1 | 2/2018 | Nguyen et al. | |
| 2018/0048591 A1 | 2/2018 | Sellappa et al. | |
| 2018/0062914 A1 | 3/2018 | Boutros | |
| 2018/0062993 A1 | 3/2018 | Wu | |
| 2018/0121433 A1* | 5/2018 | Nevrekar | G06F 16/2455 |
| 2018/0124163 A1 | 5/2018 | Abali | |
| 2018/0167475 A1 | 6/2018 | Agarwal | |
| 2018/0167476 A1 | 6/2018 | Hoffner | |
| 2018/0183706 A1 | 6/2018 | Przygienda et al. | |
| 2018/0205634 A1 | 7/2018 | Avci et al. | |
| 2018/0219953 A1 | 8/2018 | Arra | |
| 2018/0220283 A1 | 8/2018 | Condeixa | |
| 2018/0351857 A1 | 12/2018 | Vairavakkalai | |
| 2018/0367400 A1 | 12/2018 | Pani | |
| 2019/0028465 A1* | 1/2019 | Allen | H04L 61/256 |
| 2019/0034313 A1 | 1/2019 | Prasad | |
| 2019/0073419 A1 | 3/2019 | Dong | |
| 2019/0079948 A1* | 3/2019 | Ye | G06F 16/128 |
| 2019/0089575 A1 | 3/2019 | Pundir | |
| 2019/0104438 A1 | 4/2019 | Mittal | |
| 2019/0124013 A1 | 4/2019 | Murugesan | |
| 2019/0141112 A1 | 5/2019 | Kalathur | |
| 2019/0149361 A1 | 5/2019 | Sarwar | |
| 2019/0149896 A1 | 5/2019 | Grammel | |
| 2019/0155741 A1 | 5/2019 | Linke | |
| 2019/0207844 A1 | 7/2019 | Kodavanty | |
| 2019/0212968 A1 | 7/2019 | Walmsley | |
| 2019/0260670 A1 | 8/2019 | Kulkarni | |
| 2019/0297000 A1* | 9/2019 | Dutta | H04L 45/16 |
| 2019/0327166 A1 | 10/2019 | Thubert | |
| 2019/0342389 A1 | 11/2019 | Bono | |
| 2019/0349426 A1* | 11/2019 | Smith | H04L 67/104 |
| 2019/0349733 A1 | 11/2019 | Nolan | |
| 2019/0363975 A1 | 11/2019 | Djernaes | |
| 2019/0373073 A1* | 12/2019 | John | H04L 45/748 |
| 2020/0036787 A1 | 1/2020 | Gupta | |
| 2020/0044963 A1 | 2/2020 | Kwok | |
| 2020/0084103 A1 | 3/2020 | Miller et al. | |
| 2021/0075630 A1 | 3/2021 | Immidi | |
| 2021/0149752 A1* | 5/2021 | Burroughes | G06F 16/21 |

FOREIGN PATENT DOCUMENTS

| | | |
|---|---|---|
| CN | 101960426 A | 1/2011 |
| CN | 103984694 A | 8/2014 |
| CN | 104486124 | 4/2015 |
| CN | 105556502 A | 4/2016 |
| CN | 105991432 | 10/2016 |
| CN | 106878065 | 6/2017 |
| CN | 107547402 | 1/2018 |
| CN | 108075969 A | 5/2018 |
| EP | 3070877 | 9/2016 |
| JP | 2003204332 | 7/2003 |
| JP | 2015515809 | 5/2015 |
| JP | 2016536690 | 11/2016 |
| WO | 2015/070236 | 5/2015 |

OTHER PUBLICATIONS

"Husseman. ""A Beginner's Guide to Understanding the Leaf-Spine Network Topology."" In: West Monroe Partners. Mar. 23, 2015 (Mar. 23, 2015) Retrieved on Oct. 13, 2019 (Oct. 13, 2019) from <https://blog.westmonroepartners.com/a-beginners-guide-to-understanding-the-leaf-spine-network-topology/> entire document".

"Internet Engineering Task Force (IETF) Request for Comments: 7432 Category: Standards Track ISSN: 2070-1721, BGP MPLS-Based Ethernet VPN, A. Sajassi, Ed."

Juniper Networks, Understanding EVPN Pure Type 5 Routes, Sep. 16, 2022.

Juniper, Understanding EVPN Pure Route Type-5 on QFX Series Switches, Jul. 2017 (Year: 2017).

"SAMMAN et al. ""Multicast parallel pipeline router architecture for network-on-chip."" In: Proceedings of the conference on Design, automation and test in Europe. Mar. 2008 (Mar. 2008) Retrieved on Oct. 18, 2019 (Oct. 18, 2019) from <https://www.researchgate.net/profile/Manfred_ Glesner/publication/221340626_Multicast_Parall el_Pipeline_Router_Architecture_for_Network-on-Chip/links/02bfe50de0dc34c390000000/Multic ast-Parallel-Pipeline-Router-Architecture-for-Network-on-Chip.pdf> entire document".

"Saurav Haloi: ""Introduction to Apache ZooKeeper"", Internet Citation, Feb. 5, 2015 (Feb. 5, 2015), XP002806551, Retrieved from the Internet: URL:https://hub.packtpub.com/introduction-apache-zookeeper/ [retrieved on May 18, 2022] * chapter ""The ZooKeeper Watches"" *".

VXLAN Tutorial, Ohira Shinichi, Cisco Systems G.K., Jan. 20, 2016, p. 1 to 49 https://www.janog.gr.jp/meeting/janog37/download_file/vxlan.pdf.

"WU et al. ""A new multi-channel MAC protocol with on-demand channel assignment for multi-hop mobile ad hoc networks."" In: Proceedings International Symposium on Parallel Architectures, Algorithms and Networks. Dec. 9, 2000 {Dec. 9, 2000) Retrieved on Oct. 13, 2019 (Oct. 13, 2019) from <http:/fciteseerx.ist.psu.edu/viewdoc/download? doi= 1O.1.1.457 .5412&rep=rep 1&type=pdf> entire document".

* cited by examiner

1700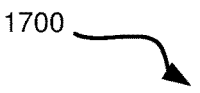

```
Receiving, By A Datastore In A Network Computing Environment, Data From A Publisher
Device, Wherein The Datastore Is Independent Of The Publisher Device.
                                    1702
```

↓

```
Partitioning The Data Into One Or More Database Partitions According To Database
Schema.
                                    1704
```

↓

```
Storing The Data Across One Or More Of A Plurality Of Shared Storage Devices Accessible
By A Plurality Of Hosts In A Processing Platform.
                                    1706
```

↓

```
Receiving A Request For The Data From A Subscriber Device, Wherein The Datastore Is
Independent Of The Subscriber Device.
                                    1708
```

↓

```
Providing The Data To The Subscriber Device.
                                    1710
```

FIG. 17

INDEPENDENT DATASTORE IN A NETWORK ROUTING ENVIRONMENT

CROSS-REFERENCE TO RELATED APPLICATIONS

This application is a continuation of U.S. patent application Ser. No. 17/469,609, filed Sep. 8, 2021, titled "INDEPENDENT DATASTORE IN A NETWORK ROUTING ENVIRONMENT, which is a continuation of U.S. patent application Ser. No. 16/549,315, filed Aug. 23, 2019, titled "INDEPENDENT DATASTORE IN A NETWORK ROUTING ENVIRONMENT," which claims priority to U.S. Provisional Patent Application Ser. No. 62/722,003 filed Aug. 23, 2018 titled "DATABASE SYSTEMS METHODS AND DEVICES," which are all incorporated herein by reference in their entirety, including but not limited to those portions that specifically appear hereinafter, the incorporation by reference being made with the following exception: In the event that any portion of the above-referenced application is inconsistent with this application, this application supersedes the above-referenced application.

TECHNICAL FIELD

The disclosure relates to computing networks and particularly relates to data storage for network routing applications.

BACKGROUND

Network computing is a means for multiple computers or nodes to work together and communicate with one another over a network. There exist wide area networks (WAN) and local area networks (LAN). Both wide and local area networks allow for interconnectivity between computers. Local area networks are commonly used for smaller, more localized networks that may be used in a home, business, school, and so forth. Wide area networks cover larger areas such as cities and can even allow computers in different nations to connect. Local area networks are typically faster and more secure than wide area networks, but wide area networks enable widespread connectivity. Local area networks are typically owned, controlled, and managed in-house by the organization where they are deployed, while wide area networks typically require two or more constituent local area networks to be connection over the public Internet or by way of a private connection established by a telecommunications provider.

Local and wide area networks enable computers to be connected to one another and transfer data and other information. For both local and wide area networks, there must be a means to determine a path by which data is passed from one compute instance to another compute instance. This is referred to as routing. Routing is the process of selecting a path for traffic in a network or between or across multiple networks. The routing process usually directs forwarding on the basis of routing tables which maintain a record of the routes to various network destinations. Routing tables may be specified by an administrator, learned by observing network traffic, or built with the assistance of routing protocols.

Small networks may use manually configured routing tables to determine how information should travel from one computer to another computer. A routing table may include a listing of "best paths" indicating the most efficient or most desirable paths between a starting computer and a final destination computer. Larger networks, including networks connected to the public Internet, may rely on complex topologies that can change rapidly such that the manual construction of routing tables is unfeasible. Dynamic routing attempts to solve this problem by constructing routing tables automatically based on information carried by routing protocols. Dynamic routing enables a network to act nearly autonomously in avoiding network failures and blockages. There exist multiple routing protocols that provide rules or instructions for determining best paths between networked device. Examples of dynamic routing protocols and algorithms include Routing Information Protocol (RIP), Open Shortest Path First (OSPF), Enhanced Interior Gateway routing Protocol (EIGRP), and Border Gateway Protocol (BGP).

In some instances, path selection involves applying a routing metric to multiple routes to select or predict the best route. Most routing algorithms use only one network path at a time. Multiple path routing techniques enable the use of multiple alternative paths. In computer networks, a routing algorithm may be used to predict the best path between two compute instances. The routing algorithm may be based on multiple factors such as bandwidth, network delay, hop count, path cost, load, maximum transfer unit, reliability, and communication cost. The routing table stores a listing of the best paths. A topological database may store a list of the best paths and may further store additional information.

In some networks, routing is complicated by the fact that no single entity is responsible for selecting best paths. Instead, multiple entities are involved in selecting best paths or event portions of a single path. In the context of computer networking over the Internet, the Internet is partitioned into autonomous systems (AS) such as Internet Service Providers (ISPs). Each autonomous system controls routes involving its network. Autonomous system-level paths are selected based on the Border Gateway Protocol (BGP). Each autonomous system-level path includes a sequence of autonomous systems through which packets of information flow to travel from one compute instance to another compute instance. Each autonomous system may have multiple paths from which to choose that are offered by neighboring autonomous systems.

In traditional network computing environments, best path determinations and other data are published by a publishing device to a plurality of subscriber devices. However, this can be computationally expensive for the publishing device. Additionally, this system provides few safeguards against system crashes and system failures. It is therefore desirable to improve the storage of networking information.

In light of the foregoing, disclosed herein are systems, methods, and devices for offloading network data to an independent datastore.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where:

FIG. 17 is a schematic flow chart diagram of a process flow for receiving and publishing data by a datastore.

DETAILED DESCRIPTION

Figure 1:
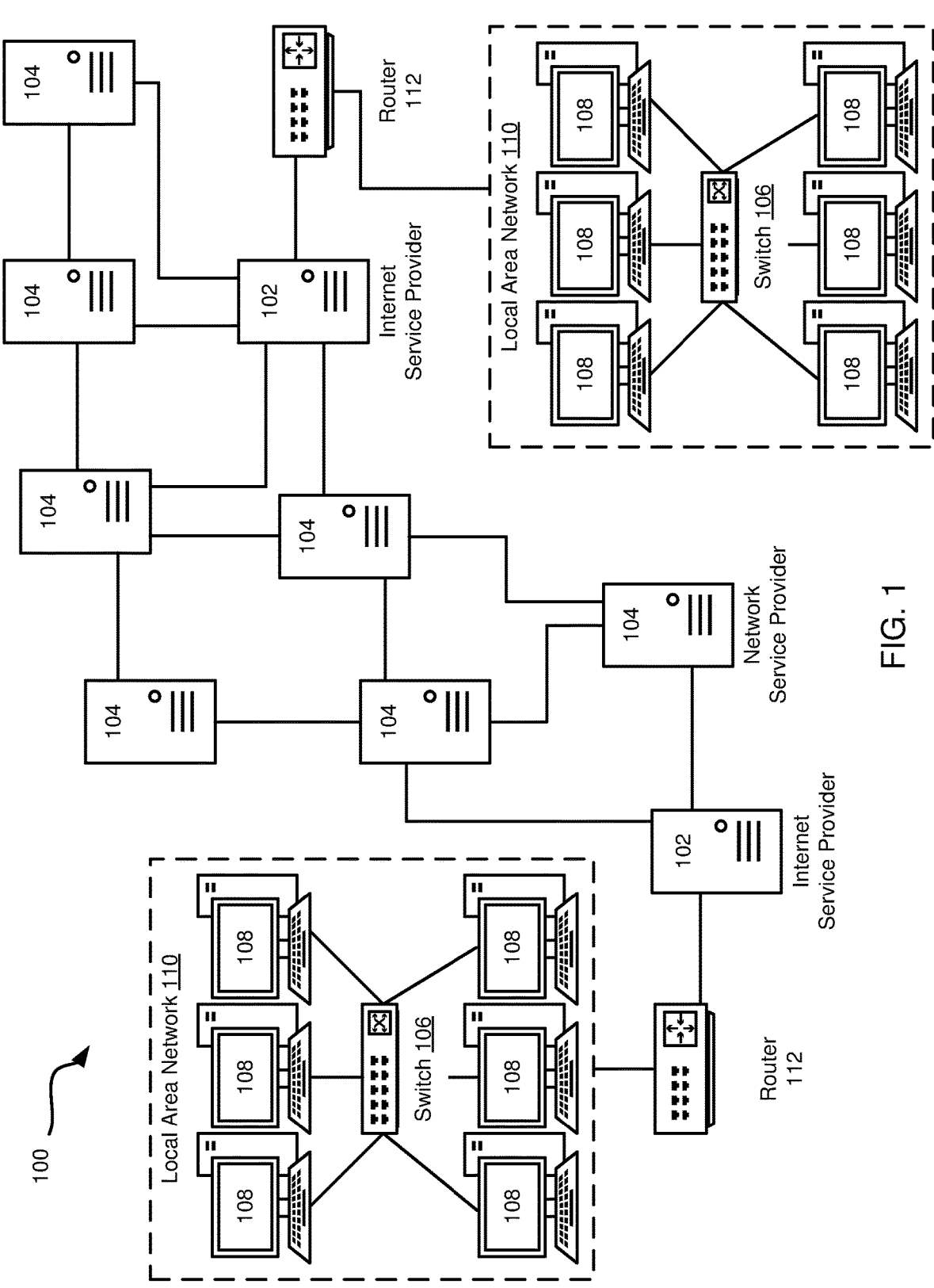
FIG. 1 is a schematic diagram of a system of networked devices communicating over the Internet.

Disclosed herein are systems, methods, and devices for improved routing for data transmission. In some instances of network routing, it is desirable to store routing information in a datastore that can quickly publish information to a multitude of locations at once. Disclosed herein are systems, methods, and devices for providing a datastore for storing network and routing information that is parallel to a box such as a router or a switch. In an embodiment, network states are offloaded to the datastore rather than being stored locally within the box.

In an embodiment, a datastore is a single database that is served by a single publish-subscribe (PUBSUB) entity. The datastore may be implemented and stored on multiple computing nodes. Each computing node may serve as a processing entity with its own independent computing processing entity and resources. Multiple nodes may interwork and act as a single computing entity or device (e.g. network devices with multiple line cards). Multiple nodes in a single computing device may still implement a single datastore but may run individual copies of datastore components on each node and interwork within themselves to make the datastore look like a datastore to any client running on any of the multiple compute nodes.

Embodiments of the disclosure may be deployed for storing network routing information in a datastore. The datastore provides flexibility to host data remotely rather than locally on a networking device such as a router or switch. In an embodiment, the datastore is configured for storing one or more routing tables for networked devices. The datastore can provide processing and storage resources for running applications outside the networking device. The datastore provides an ability to scale vertically and horizontally for adding storage and processing resources in a network routing environment. In an embodiment, the datastore hosts data outside the networking device and is configured to partition the data into a plurality of partitions. The partitions can be hosted on multiple storage devices that may be in communication with one another.

In an embodiment, the datastore is accessible by multiple networking devices such as routers and switches. As discussed herein, a networking device may be referred to as a BGP instance if the network device runs or stores paths determined by the Border Gateway Protocol (BGP). The BGP is used for determining a best path for transmitting data from a starting point to a destination point. In an embodiment, each of the networking devices can read information in the datastore to identify a best path for transmitting data so the data reaches its final destination. In an embodiment, each of the networking devices stores its own state at runtime and transmits its state to be replicated in the datastore. The datastore may be connected to multiple networking devices and store all states for each of the multiple networking devices. The states for each of the networking devices can thereby be offloaded to the datastore in any suitable format. In an embodiment, the datastore receives state information from multiple networking devices in real-time at runtime. The datastore may further be configured to receive snapshots of stored state information from multiple networking devices.

In an embodiment, the datastore is organized with a user-defined storage structure. The storage structure may include a hierarchy and organization defined with a JSON (JavaScript Object Notation) based schema. The datastore may support a wide range of data structure types and support new data structure types when the need arises.

In an embodiment, the datastore provides support for memory diagnosis by leveraging a publish-subscribe infrastructure. In software architecture, publish-subscribe is a messaging pattern wherein a publisher indirectly sends a message to a subscribe without directly sending the message to the subscriber. The publisher instead categorizes the message into classes without knowledge of the subscribers. Similarly, subscribers express interest in one or more classes and only receive messages that are of interest. In the publish-subscribe messaging pattern, messages are "published" by publishers and then received by all appropriate subscribers. The datastore may leverage the publish-subscribe infrastructure for any application that needs a publish service hosted by itself or other applications.

In an embodiment, the datastore can be searched or queried by connected client accounts or networking devices. The datastore can return responses for customized searches using table indices. The datastore provides support for storing data across multiple data partitions. The data may be located across the multiple data partitions based on metadata stored locally on the datastore.

A BGP instance is a device for routing information in a network. A BGP instance may take the form of a route reflector appliance. The BGP instance may run on a switch, router, or BGP speakers on a switch. At a high level, the BGP instance sends all the paths it has learnt for a prefix to the best path controller. The best path controller responds with a set of best path from amongst those paths. The best path controller is permitted to modify the next-hop and attributes for any of the paths. Once the best paths are received, the BGP instance updates the local Routing Information Base (RIB) and advertises the best path out to its neighbors.

In an embodiment, a method is provided for offloading data storage in a network environment. The method includes receiving, by a datastore in a network computing environment, data from a publisher device, wherein the datastore is independent of the publisher device. The method includes partitioning the data into one or more database partitions according to database schema. The method includes storing the data. The method includes receiving a request for the data from a subscriber device, wherein the datastore is independent of the subscriber device. The method includes providing the data to the subscriber device.

For purposes of furthering understanding of the disclosure, some explanation will be provided for numerous networking computing devices and protocols.

A switch (may alternatively be referred to as a switching hub, bridging hub, or MAC bridge) creates a network. Most internal networks use switches to connect computers, printers, phones, camera, lights, and servers in a building or campus. A switch serves as a controller that enables networked devices to talk to each other efficiently. Switches connect devices on a computer network by using packet switching to receive, process, and forward data to the destination device. A network switch is a multiport network bridge that uses hardware addresses to process and forward data at a data link layer (layer 2) of the Open Systems Interconnection (OSI) model. Some switches can also process data at the network layer (layer 3) by additionally incorporating routing functionality. Such switches are commonly known as layer-3 switches or multilayer switches.

A router connects networks. Switches and routers perform similar functions, but each has its own distinct function to perform on a network. A router is a networking device that forwards data packets between computer networks. Routers perform the traffic directing functions on the Internet. Data sent through the Internet, such as a web page, email, or other form of information, is sent in the form of a data packet. A packet is typically forwarded from one router to another router through the networks that constitute an internetwork (e.g., the Internet) until the packet reaches its destination node. Routers are connected to two or more data lines from different networks. When a data packet comes in on one of the lines, the router reads the network address information in the packet to determine the ultimate destination. Then, using information in the router's routing table or routing policy, the router directs the packet to the next network on its journey. A BGP speaker is a router enabled with the Border Gateway Protocol (BGP).

A routing table or routing information base (RIB) is a data table stored in a router or a networked computer that lists the routes to particular network destinations. In some cases, a routing table includes metrics for the routes such as distance, weight, and so forth. The routing table includes information about the topology of the network immediately around the router on which it is stored. The construction of routing tables is the primary goal of routing protocols. Static routes are entries made in a routing table by non-automatic means and which are fixed rather than being the result of some network topology discovery procedure. A routing table may include at least three information fields, including a field for network ID, metric, and next hop. The network ID is the destination subnet. The metric is the routing metric of the path through which the packet is to be sent. The route will go in the direction of the gateway with the lowest metric. The next hop is the address of the next station to which the packet is to be sent on the way to its final destination. The routing table may further include quality of service associate with the route, links to filtering criteria lists associated with the route, interface for an Ethernet card, and so forth.

For purposes of illustrating the concept of a routing table, the routing table may be analogized to using a map for delivering a package. A routing table is similar to the use of a map for delivering a package to its final destination. When a node needs to send data to another node on a network, the node must first know where to send the data. If the node cannot directly connect to the destination node, the node must send the data to other nodes along a proper route to the destination node. Most nodes do not try to figure out which routes might work. Instead, a node will send an IP packet to a gateway in the LAN, which then decides how to route the data to the correct destination. Each gateway will need to keep track of which way to deliver various packages of data, and for this it uses a routing table. A routing table is a database that keeps track of paths, like a map, and uses these paths to determine which way to forward traffic. Gateways can also share the contents of their routing table with other nodes requesting the information.

For hop-by-hop routing, each routing table lists, for all reachable destinations, the address of the next device along the path to that destination, i.e. the next hop. Assuming the routing tables are consistent, the algorithm of relaying packets to their destination's next hop thus suffices to deliver data anywhere in a network. Hop-by-hop is a characteristic of an IP Internetwork Layer and the Open Systems Interconnection (OSI) model.

The Open Systems Interconnection (OSI) model is a conceptual model that characterizes and standardizes the communication functions of a computing system without regard to its underlying internal structure and technology. The goal of the OSI model is the interoperability of diverse communication systems with standard communication protocols. The OSI model partitions a communication system into abstraction layers. A layer serves the layer above it and is served by the layer below. For example, a layer that provides error-free communications across a network provides the path needed by applications above it, while it calls the next lower layer to send and receive packets that constitute the contents of that path. Two instances at the same layer are visualized as connected by a horizontal connection in that layer. Communication protocols enable an entity in one host to interact with a corresponding entity at the same layer in another host. Service definitions, like the OSI model, abstractly describe the functionality provided to an (N)-layer by an (N−1)-layer, wherein Nis one of the layers of protocols operating in the local host.

Route control is a type of network management that aims to improve Internet connectivity and reduce bandwidth cost and overall internetwork operations. Some route control services include a suite of hardware-based and software-based products and services that work together to improve overall Internet performance and finetune the use of available Internet bandwidth at minimal cost. Route control can be successful in scenarios where a network or autonomous system is sourcing Internet bandwidth from multiple providers. Route control can aid in the selection of the most optimal path for data transmission.

Some network communication systems are large, enterprise-level networks with thousands of processing nodes. The thousands of processing nodes share bandwidth from multiple Internet Service Providers (ISPs) and can process significant Internet traffic. Such systems can be extremely complex and must be properly configured to result in acceptable Internet performance. If the systems are not properly configured for optimal data transmission, the speed of Internet access can decrease, and the system can experience high bandwidth consumption and traffic. To counteract this problem, a set of services may be implemented to remove or reduce these concerns. This set of services may be referred to as routing control.

An embodiment of a routing control mechanism is composed of hardware and software. The routing control mechanism monitors all outgoing traffic through its connection with an Internet Service Provider (ISP). The routing control mechanism aids in selecting the best path for efficient transmission of data. The routing control mechanism may calculate the performance and efficiency of all ISPs and select only those ISPs that have performed optimally in applicable areas. Route control devices can be configured according to defined parameters pertaining to cost, performance, and bandwidth.

A known algorithm for determining the best path for the transmission of data is referred to as the Border Gateway Protocol (BGP). BGP is a path-vector protocol that provides routing information for autonomous systems on the Internet. When BGP is configured incorrectly, it can cause sever availability and security issues. Further, modified BGP route information can permit attackers to redirect large blocks of traffic so the traffic travels to certain routers before reaching its intended destination. The BGP best path algorithm can be implemented to determine the best path to install in an Internet Protocol (IP) routing table for traffic forwarding. BGP routers may be configured to receive multiple paths to the same destination.

The BGP best path algorithm assigns a first valid path as the current best path. The BGP best path algorithm compares the best path with the next path in the list until the BGP reaches the end of the list of valid paths. The list provides the rules that are used to determine the best path. For example, the list may include an indication that the path with the highest weight is preferred, the path without a local preference is preferred, the path that was locally originated by way of a network or aggregate BGP is preferred, a shortest path is preferred, a path with he lowest multi-exit discriminator is preferred, and so forth. The BGP best path selection process can be customized.

In the context of BGP routing, each routing domain is known as an autonomous system (AS). BGP assists in selecting a path through the Internet to connect two routing domains. BGP typically selects a route that traverses the least number of autonomous systems, referred to as the shortest AS path. In an embodiment, once BGP is enabled, a router will pull a list of Internet routes from BGP neighbors which may be ISPs. BGP will then scrutinize the list to find routes with the shortest AS paths. These routes may be entered in the router's routing table. Generally, a router will choose the shortest path to an AS. BGP uses path attributes to determine how to route traffic to specific networks.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems and methods for providing a datastore in a network computing environment are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Referring now to the figures, FIG. 1 illustrates a schematic diagram of a system 100 for connecting devices to the Internet. The system 100 includes multiple local area network 160 connected by a switch 106. Each of the multiple local area networks 160 can be connected to each other over the public Internet by way of a router 162. In the example system 100 illustrated in FIG. 1, there are two local area networks 160. However, it should be appreciated that there may be many local area networks 160 connected to one another over the public Internet. Each local area network 160 includes multiple computing devices 108 connected to each other by way of a switch 106. The multiple computing devices 108 may include, for example, desktop computers, laptops, printers, servers, and so forth. The local area network 160 can communicate with other networks over the public Internet by way of a router 162. The router 162 connects multiple networks to each other. The router 162 is connected to an internet service provider 102. The internet service provider 102 is connected to one or more network service providers 104. The network service providers 104 are in communication with other local network service providers 104 as shown in FIG. 1.

The switch 106 connects devices in the local area network 160 by using packet switching to receive, process, and forward data to a destination device. The switch 106 can be configured to, for example, receive data from a computer that is destined for a printer. The switch 106 can receive the data, process the data, and send the data to the printer. The switch 106 may be a layer-1 switch, a layer-2 switch, a layer-3 switch, a layer-4 switch, a layer-7 switch, and so forth. A layer-1 network device transfers data but does not manage any of the traffic coming through it. An example of a layer-1 network device is an Ethernet hub. A layer-2 network device is a multiport device that uses hardware addresses to process and forward data at the data link layer (layer 2). A layer-3 switch can perform some or all of the functions normally performed by a router. However, some network switches are limited to supporting a single type of physical network, typically Ethernet, whereas a router may support different kinds of physical networks on different ports.

The router 162 is a networking device that forwards data packets between computer networks. In the example system 100 shown in FIG. 1, the routers 162 are forwarding data packets between local area networks 160. However, the router 162 is not necessarily applied to forwarding data packets between local area networks 160 and may be used for forwarding data packets between wide area networks and so forth. The router 162 performs traffic direction functions on the Internet. The router 162 may have interfaces for different types of physical layer connections, such as copper cables, fiber optic, or wireless transmission. The router 162 can support different network layer transmission standards. Each network interface is used to enable data packets to be forwarded from one transmission system to another. Routers 162 may also be used to connect two or more logical groups of computer devices known as subnets, each with a different network prefix. The router 162 can provide connectivity within an enterprise, between enterprises and the Internet, or between internet service providers' networks as shown in FIG. 1. Some routers 162 are configured to interconnecting various internet service providers or may be used in large enterprise networks. Smaller routers 162 typically provide connectivity for home and office networks to the Internet. The router 162 shown in FIG. 1 may represent any suitable router for network transmissions such as an edge router, subscriber edge router, inter-provider border router, core router, internet backbone, port forwarding, voice/data/fax/video processing routers, and so forth.

The internet service provider (ISP) 102 is an organization that provides services for accessing, using, or participating in the Internet. The ISP 102 may be organized in various forms, such as commercial, community-owned, non-profit, or privately owned. Internet services typically provided by ISPs 102 include Internet access, Internet transit, domain name registration, web hosting, Usenet service, and colocation. The ISPs 102 shown in FIG. 1 may represent any suitable ISPs such as hosting ISPs, transit ISPs, virtual ISPs, free ISPs, wireless ISPs, and so forth.

The network service provider (NSP) 104 is an organization that provides bandwidth or network access by providing direct Internet backbone access to Internet service providers. Network service providers may provide access to network access points (NAPs). Network service providers 104 are sometimes referred to as backbone providers or Internet providers. Network service providers 104 may include telecommunication companies, data carriers, wireless communication providers, Internet service providers, and cable television operators offering high-speed Internet access. Network service providers 104 can also include information technology companies.

It should be appreciated that the system 100 illustrated in FIG. 1 is exemplary only and that many different configurations and systems may be created for transmitting data between networks and computing devices. Because there is a great deal of customizability in network formation, there is a desire to create greater customizability in determining the best path for transmitting data between computers or between networks. In light of the foregoing, disclosed herein are systems, methods, and devices for offloading best path computations to an external device to enable greater customizability in determining a best path algorithm that is well suited to a certain grouping of computers or a certain enterprise.

Figure 2:
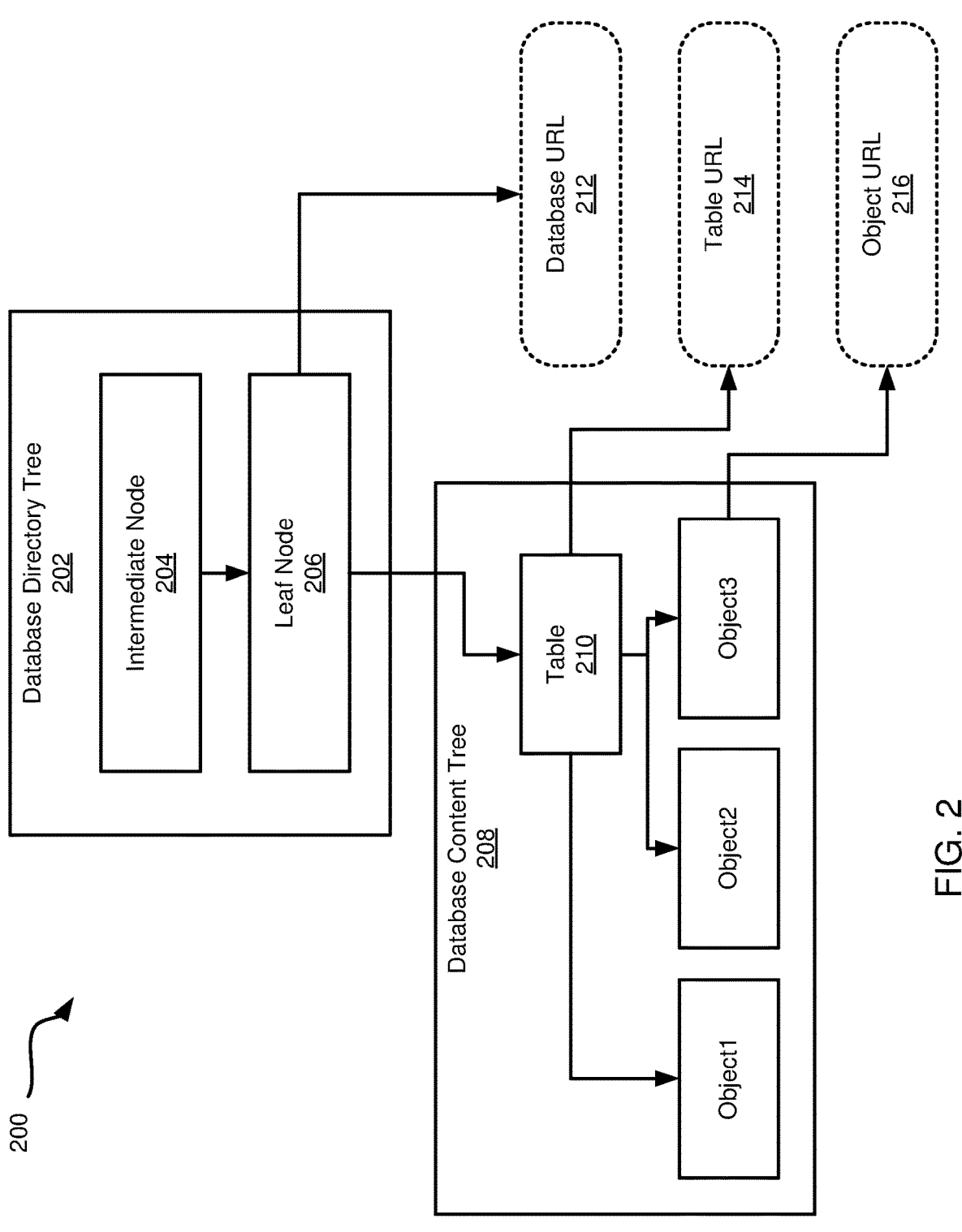
FIG. 2 is a schematic diagram illustrating how data is stored hierarchically in a datastore.

FIG. 2 illustrates a logical layout of data stored in a datastore 200 and the addressing mechanisms for accessing data within the datastore 200. The addressing mechanisms include the database URL 212, the table URL 214, and the object URL 216. The datastore 200 may be implemented as a client/server-based model of a publish-subscribe ("PUB-SUB" or "Pub/Sub") database that offers enhanced flexibility. The datastore 200 may provide a two-hop data path between a producer and a subscriber with a database host server. The host server 310 may be inserted between the producer and the subscriber.

The datastore 200 includes a database directory tree 202 that includes an intermediate node 204 and a leaf node 206. The leaf node 206 is in communication with a table 210 stored in a database content tree 208. The table 210 stores information for multiple objects such as object1, object2, and object 3 as shown in FIG. 2. The leaf node 206 is accessible by way of a database URL 212. The database URL 212 may be provided to a client account for accessing the leaf node 206. Similarly, the table 210 is accessible by way of a table URL 214 and the objects are accessible by way of object URLs 216.

In an embodiment, the datastore 200 further includes a host library that allows apps to pose as a datastore host server 310 for data produced by an application. If the dataset is hosted and embedded on the host server and produced by the hosting app, an additional InterProcess Communication (IPC) hop may be avoided between the producer and the host server. In an embodiment, the datastore 210 may provide a one hop direct data path from a producer to a subscriber by combining a database host with the producer device.

Data may be stored in the hierarchal database directory tree 202. The database directory tree 202 may allow for wildcard subscriptions of data. A wildcard subscription may be an ad hoc, unexpected, one-off, or other singular event in which a subscriber, for example, requests data from a publisher. Wildcard subscriptions of the data may span over the dataset produced by more than one producer device. Alternatively, wildcard subscriptions may span over the dataset produced by more than one producer device. Alternatively, wildcard subscriptions may be hosted across multiple database host servers 310. When appropriately partitioned, the wildcard subscriptions provide for effective horizontal scaling by providing a plurality of parallel data paths between producers and subscribers where the producer device includes the database host.

One advantage of the datastore as discussed herein is that the producer does not maintain the overhead of serving each subscriber by itself. Instead, overhead may be offloaded to one, or potentially a plurality, of the host server 310.

An additional advantage of the datastore as discussed herein is that an entire dataset produced by a single producer can be partitioned into subsets using appropriate data partitions. The data partitions can be assigned to different database host servers 310 as needed. This partitioning allows parallel data paths to be created between producers and subscribers while allowing for horizontal scaling. For example, a plurality of database host servers 310 can each create parallel data paths between producers and subscribers. Further, datastore 200 server components can be hosted on a separate server cluster to aid in offloading processing overhead to other devices.

In an embodiment, the datastore as discussed herein provides support for runtime diagnoses and system monitoring. For example, the datastore may collect diagnostic information from all datastore clients using the publish-subscribe infrastructure of the datastore.

Figure 3:
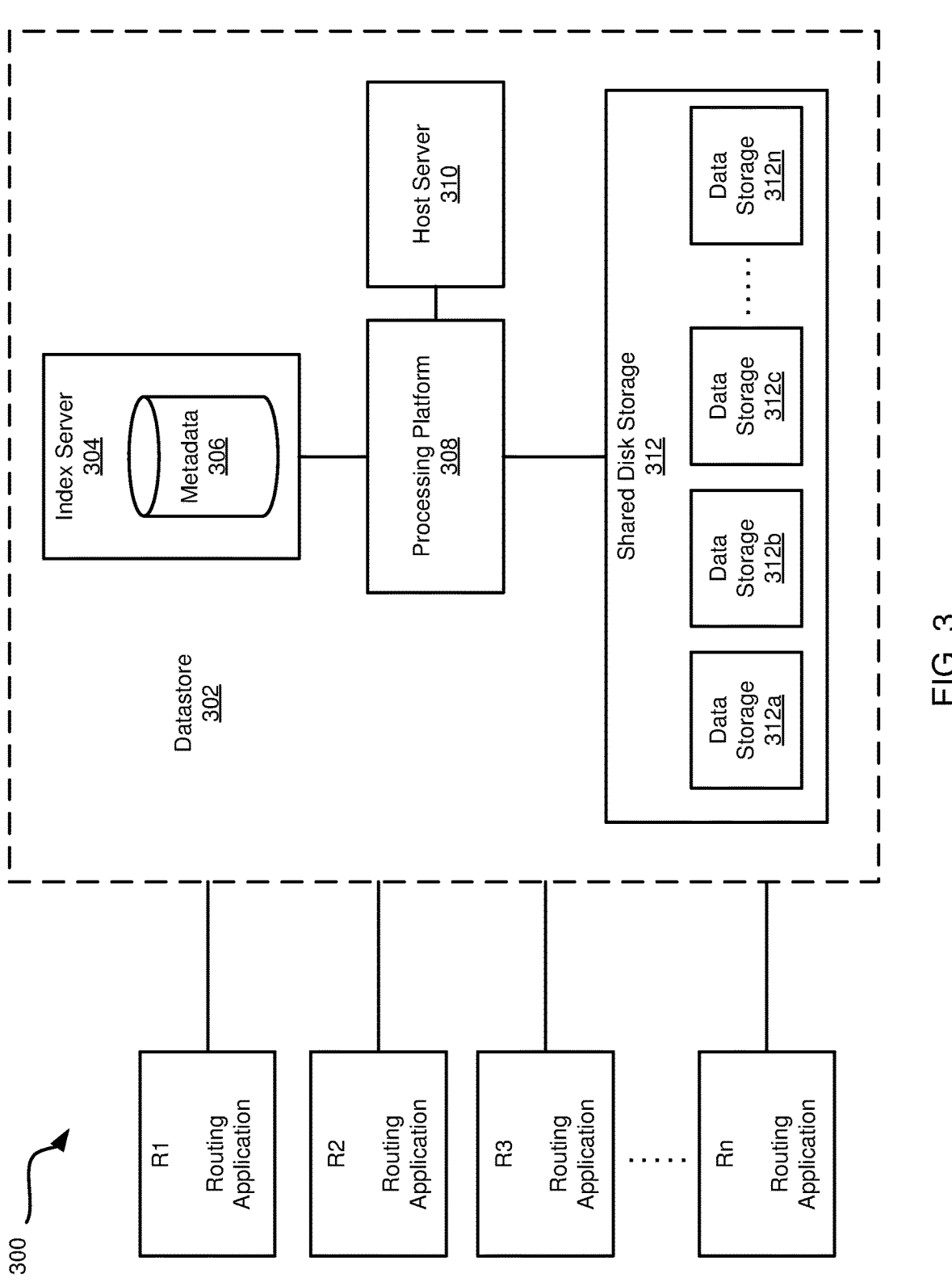
FIG. 3 is a schematic diagram illustrating how networking information from various applications on a single device can be offloaded and stored in a datastore.

FIG. 3 is a schematic diagram of a system 300 for offloading storage of best path computations and routes to a datastore 302. The system includes a datastore 302 in communication with multiple applications R1, R2, R3, Rn. The datastore 302 includes an index server 304 in communication with metadata 306. The metadata 306 provides an indication of where certain data is located within shared disk storage 312. The shared disk storage 312 includes a plurality of data storage devices 312a, 312b, 312c, 312n. The index server 304 is in communication with a processing platform 308 and the processing platform 308 has access to the shared disk storage 312. The index server 304 is configured to provide an indication to the processing platform 308 of where certain data is located in the shared disk storage 312. The index server 304 makes this determination based on the metadata 306. The datastore 302 includes a host server 310 in communication with the processing platform 308. The host server 310 enables the processing platform 308 to write to the shared disk storage 312 by updating, adding, or deleting information in the shared disk storage 312. The processing platform 308 may include a plurality of hosts each comprising a processor and cache storage. Each of the hosts can be configured to read and write information in the shared disk storage 312.

Figure 4:
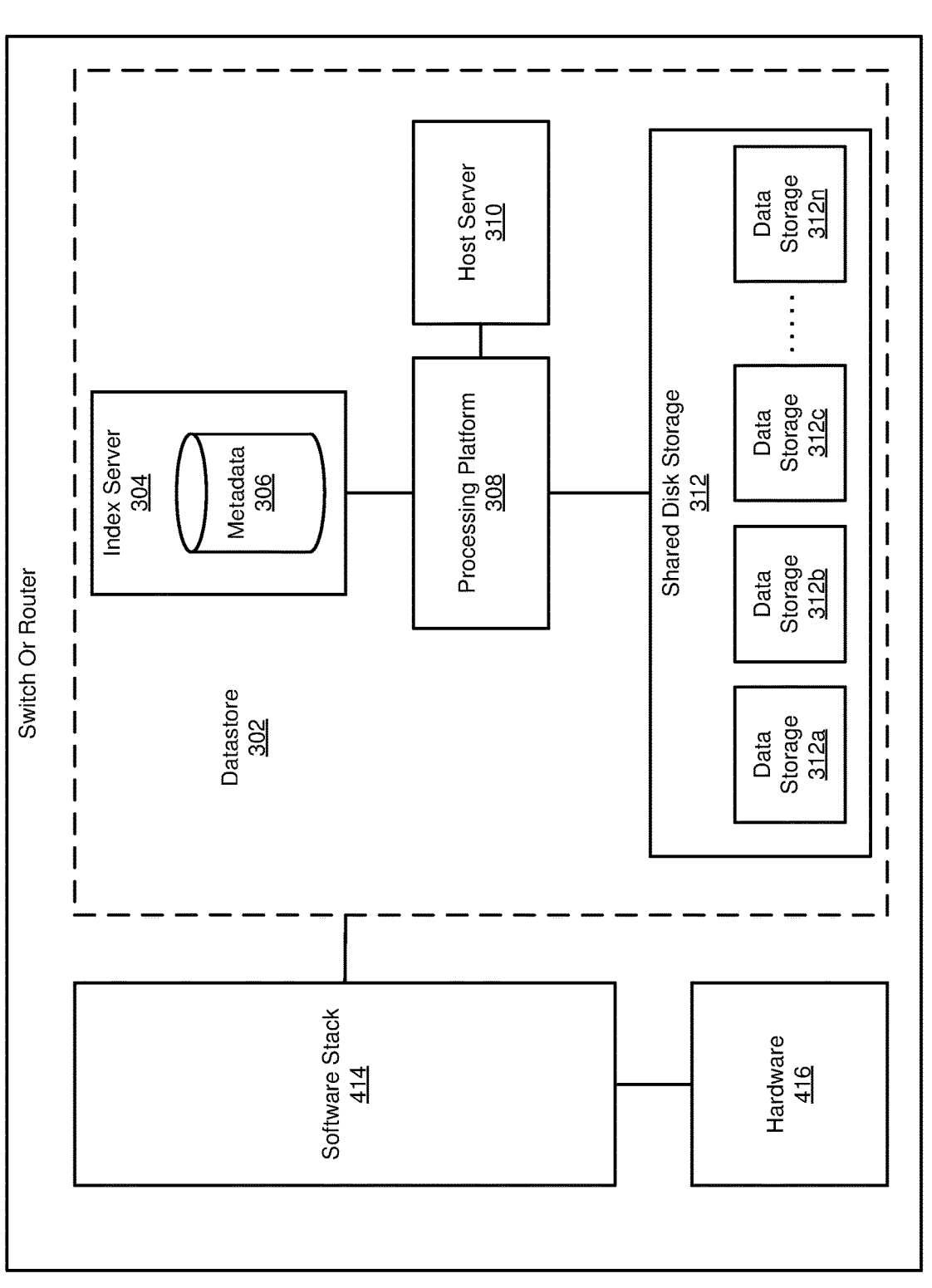
FIG. 4 is a schematic diagram illustrating how networking information on a network device is stored in a datastore implemented locally on the same device.

FIG. 4 illustrates an embodiment wherein information is offloaded to a datastore 302 and the datastore 302 is local to a switch or router. The switch or router further includes hardware 416 and a software stack 414. The hardware 416 provides a physical connection that enables the transmission of data packets between computers or networks. The software stack 414 includes instructions to be implemented by a processor or hardware 416 for determining best paths and forwarding data packets along the best path for its destination device.

Figure 5:
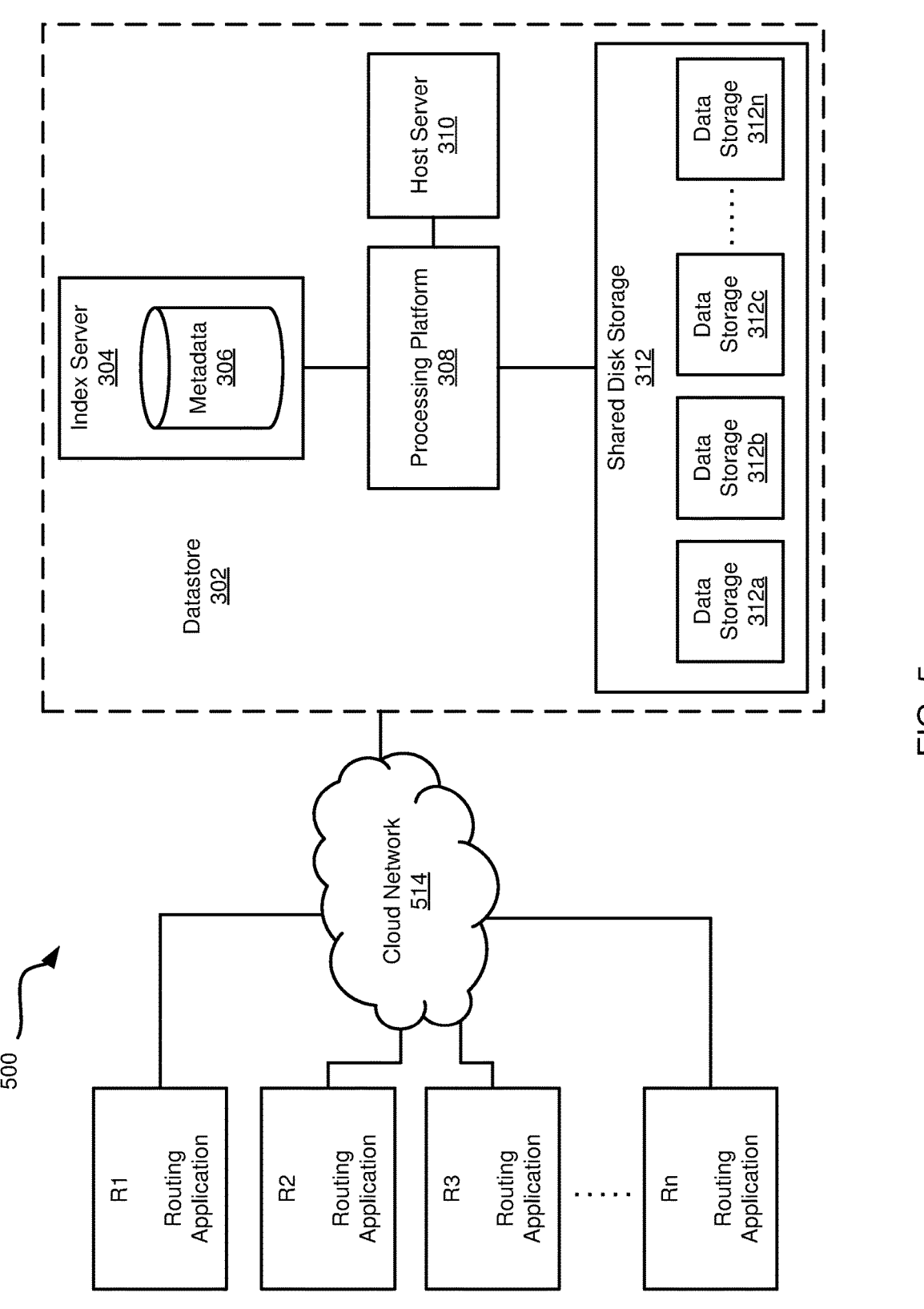
FIG. 5 is a schematic diagram illustrating how storage of networking information can be offloaded to a datastore implemented elsewhere on a remote device.

FIG. 5 illustrates an embodiment of a system 500 wherein information is offloaded to a datastore 302 and the datastore 302 is accessible over a cloud network 514. In an embodiment, the datastore 302 is a cloud-based database that is accessible by multiple networking devices R1, R2, R3, Rn.

Figure 6:
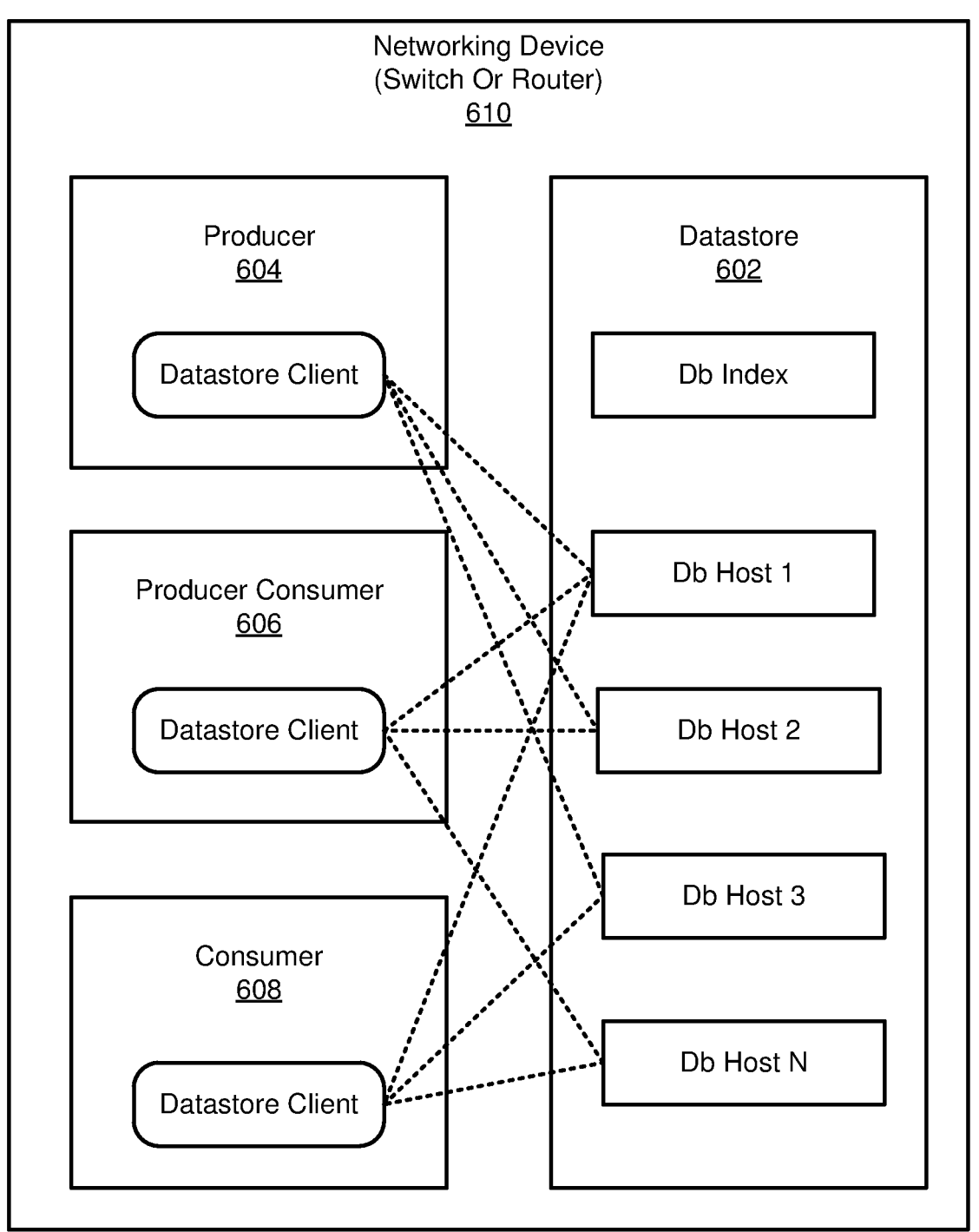
FIG. 6 is a schematic diagram of communications between producers, producer consumers, and consumes with a datastore.

FIG. 6 is a schematic diagram of communications between producers, producer consumers, and consumers within a datastore. In an embodiment, there is a datastore 602 local to the networking device that stores pertinent information for the system. The datastore 602 may be a database storing best path information for one or more routers or switches. The datastore 602 may further store system state information such as CPU utilization, temperature, fan speed, and state information for peripherals such as LEDs or other devices. The datastore 602 may store a variety of information that may be useful to a monitoring agent. The information in the datastore 602 can be streamed out to another controller or device that could want such information. The datastore 602 may include a database index and may include multiple hosts. Each of the multiple hosts may include a processor and cache memory. In the example embodiment shown in FIG. 6, the datastore 602 includes a database host 1, a database host 2, a database host 3, and so on thru database host n.

The datastore 602 is in communication with a producer 604, a producer consumer 606, and a consumer 608. The producer 604 is an entity that creates data and adds to the datastore 602. A consumer 608 is an entity that reads data in the datastore 602. A producer consumer 606 is an entity that can produce a dataset and read a dataset in the datastore. In an embodiment, the producer consumer 606 can produce a first dataset in the datastore 602 and can read a second dataset in the datastore 602. The data includes, for example, status updates, computation results, state information, and so forth.

Figure 7:
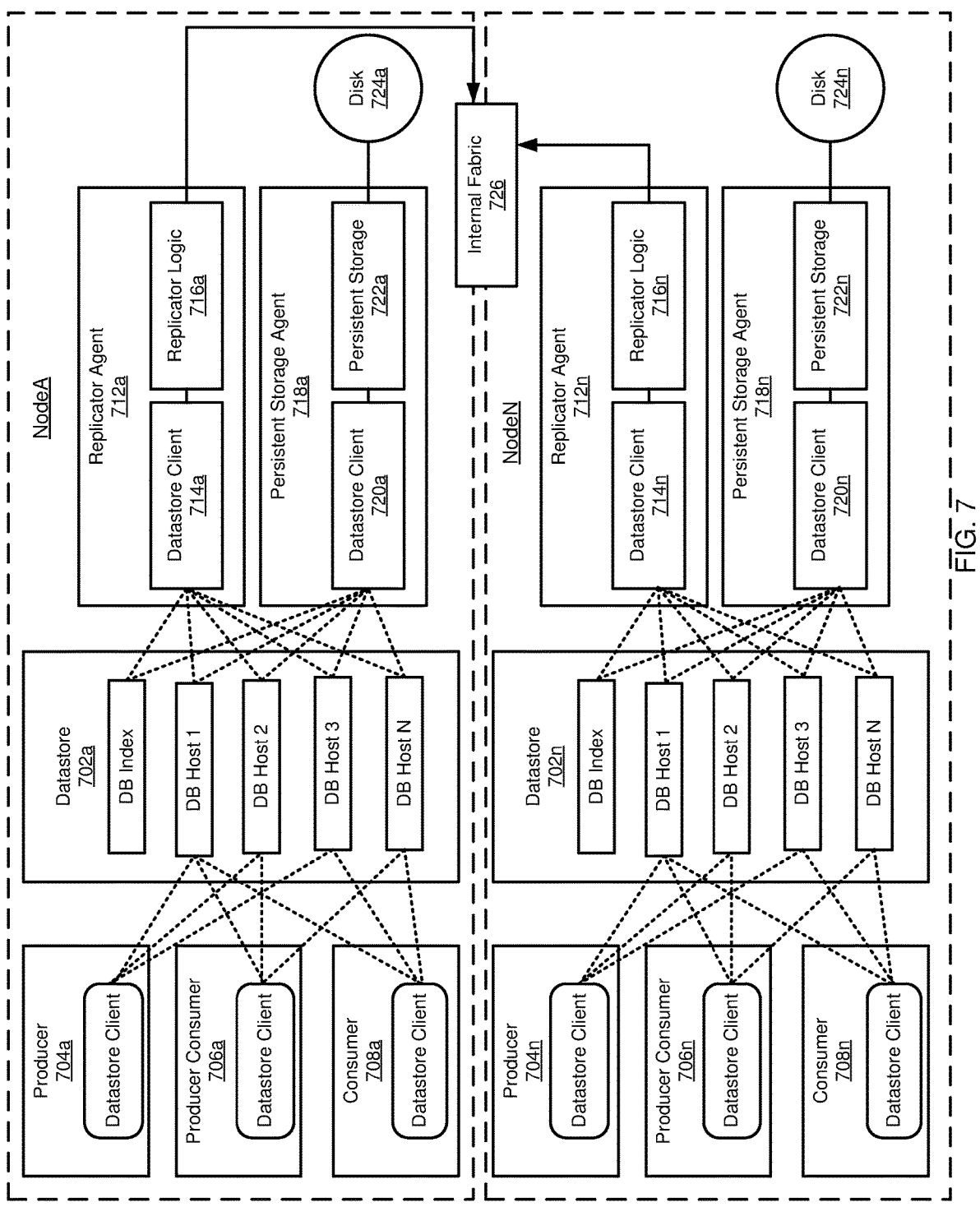
FIG. 7 is a schematic diagram illustrating how a datastore is implemented across multiple nodes of a single networking device.

FIG. 7 is a schematic diagram of an embodiment of a datastore. The datastore shown in FIG. 7 illustrates a database cluster for multiple nodes in a single device of a datastore. The datastore may be implemented a publish-subscribe datastore. The datastore includes two nodes illustrated as discrete blocks. In the example implementation shown in FIG. 7, the datastore includes a NodeA and a NodeN. Each of the nodes include the same components connected by an internal fabric 726. The nodes each include a producer 704a, 704n in communication with a datastore client, a producer consumer 706a, 706n in communication with a datastore client, and a consumer 708a, 708n in communication with a datastore client. Each of the nodes includes a local datastore 702a, 702n for storing state information. The local datastore 702a, 702n includes a database index along with multiple database hosts such as DB host 1, DB host 2, DB host 3, DB host n. The local datastore 702a, 702n is in communication with a replicator agent 712a, 712n. The replicator agent 712a, 712n is in communication with a datastore client 714a, 714n and includes replicator logic 716a, 716n. The persistent storage agent 718a, 718n is in communication with a datastore client 720a, 720n and has persistent storage 722a, 722n for storing data. The persistent storage agent 718a, 718n is in communication with disk storage 724a, 724n for storing data. The replicator agents 712a, 712n are in communication with internal fabric 726 for sharing datastore information between NodeA and NodeN and any other nodes that may also be connected to the internal fabric 726.

When the single node architecture shown in FIG. 7 is used, one or more separate database host servers may be implemented to provide data flows between a producer and a consumer, and to host the distributed datastore. The entire database may be partitioned into independent datasets. A hosting server process may be dedicated to one or more of the independent sets. A single database indexing server may be deployed to maintain mapping of hosting servers and corresponding datasets they host.

In an embodiment, a consumer 708a, 708n may connect to the database index server (see 304) by a datastore client. The database client can connect to the database index server 304 to register and subscribe interests in certain datasets. Producers 704a, 704n may connect to the database index server 304 by a datastore client to receive information about which hosting server to use and further to receive updates about the database. The producer 704a, 704n can connect to a specific hosting server and publish additions, modifications, deletions, and data objects. Consumers 708a, 708n may be notified by the database index server 304 of new, modified, and/or deleted objects and be connected to appropriate hosting servers to download datasets produced by producers 704a, 704n.

A separate datastore replicator agent 712a, 712n may connect to the datastore 702a, 702n as a datastore client acting both as a consumer and producer. The replicator agent 712a, 712n is used to assist in replicating database to and from other nodes in the same device. The replicator agent 712a, 712n may act as a consumer for all data objects produced on the local node and act as a producer for all data objects produced on a remote node.

A separate persistent storage agent 718a, 718n may connect to the datastore 702a, 702n as both a producer and consumer and help store and restore data objects to a persistent memory storage device such as persistent storage 722a, 722n or disk 724a, 724n.

As database size increases, more servers may be deployed to balance load distribution. The database may be partitioned into independent partitions allowing each server to host a subset of the partitions.

Figure 8:
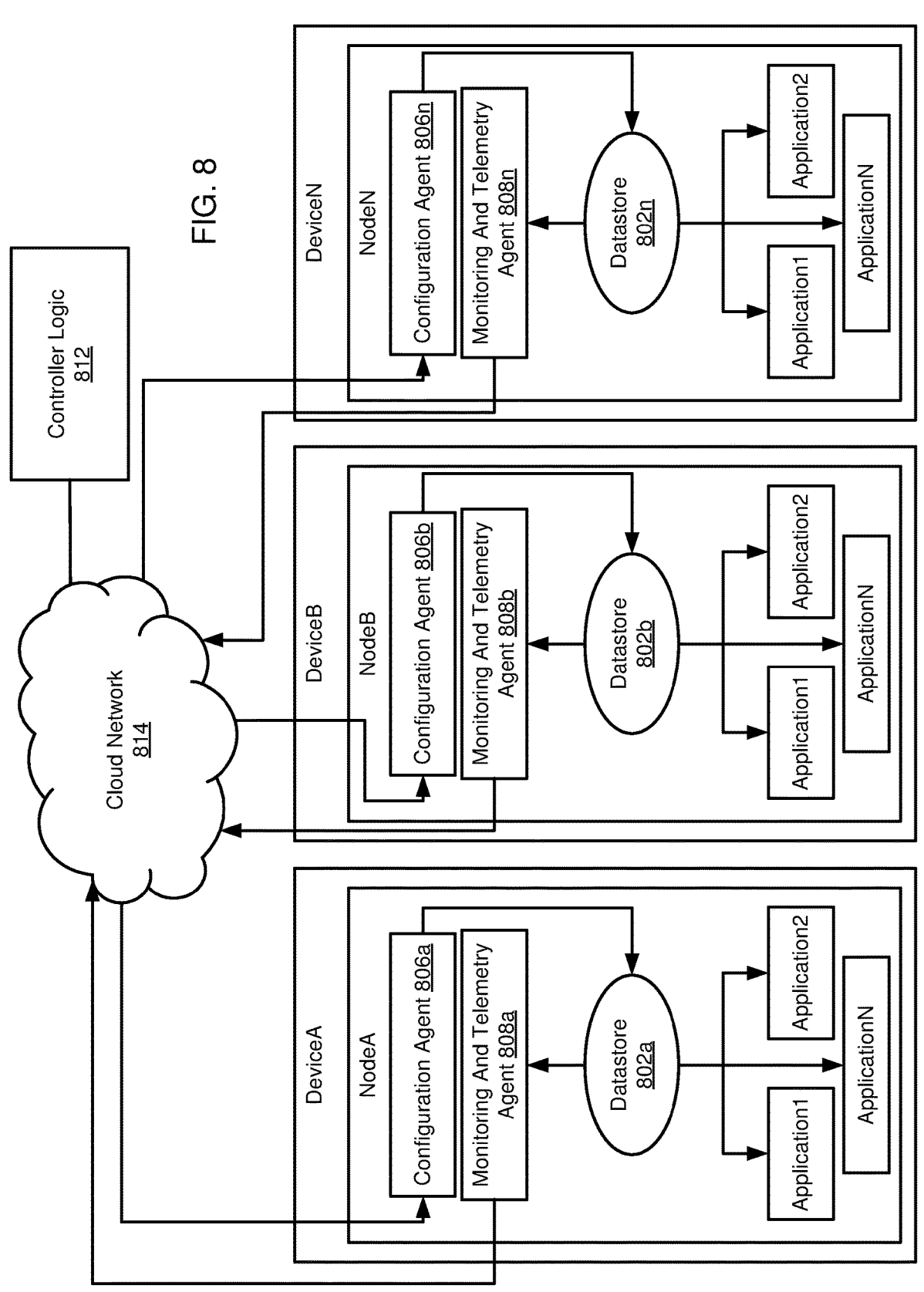
FIG. 8 is a schematic diagram illustrating multiple devices being controlled by a remote controller offloaded to a cloud computing network.

FIG. 8 is a schematic diagram illustrating multiple devices being controlled by remote controller logic 812 offloaded to a cloud computing network. Each device, including DeviceA, DeviceB, and DeviceN includes one or more nodes, namely NodeA, NodeB, and NodeN. In the embodiment shown in FIG. 8 there are illustrated three separate devices but it should be appreciated there may be any number of devices and nodes without departing from the scope of the disclosure. Each device includes a configuration agent 806 receiving communications from the controller logic 812 by way of the cloud network 814. Each device includes a monitoring and telemetry agent 808 providing data to the controller logic 812 by way of the cloud network 814. Each device includes a datastore 802 and one or more applications in communication with the datastore 802.

The devices and the nodes are separate and independent and each include their own datastore. There is no datastore replication between the devices and the nodes. The devices and nodes individually send data from their respective monitoring and telemetry agents 808. The controller logic 812 performs processing based on the combined data from the multiple devices and nodes and sends each nod configuration updates based on the results of the processing.

Figure 9:
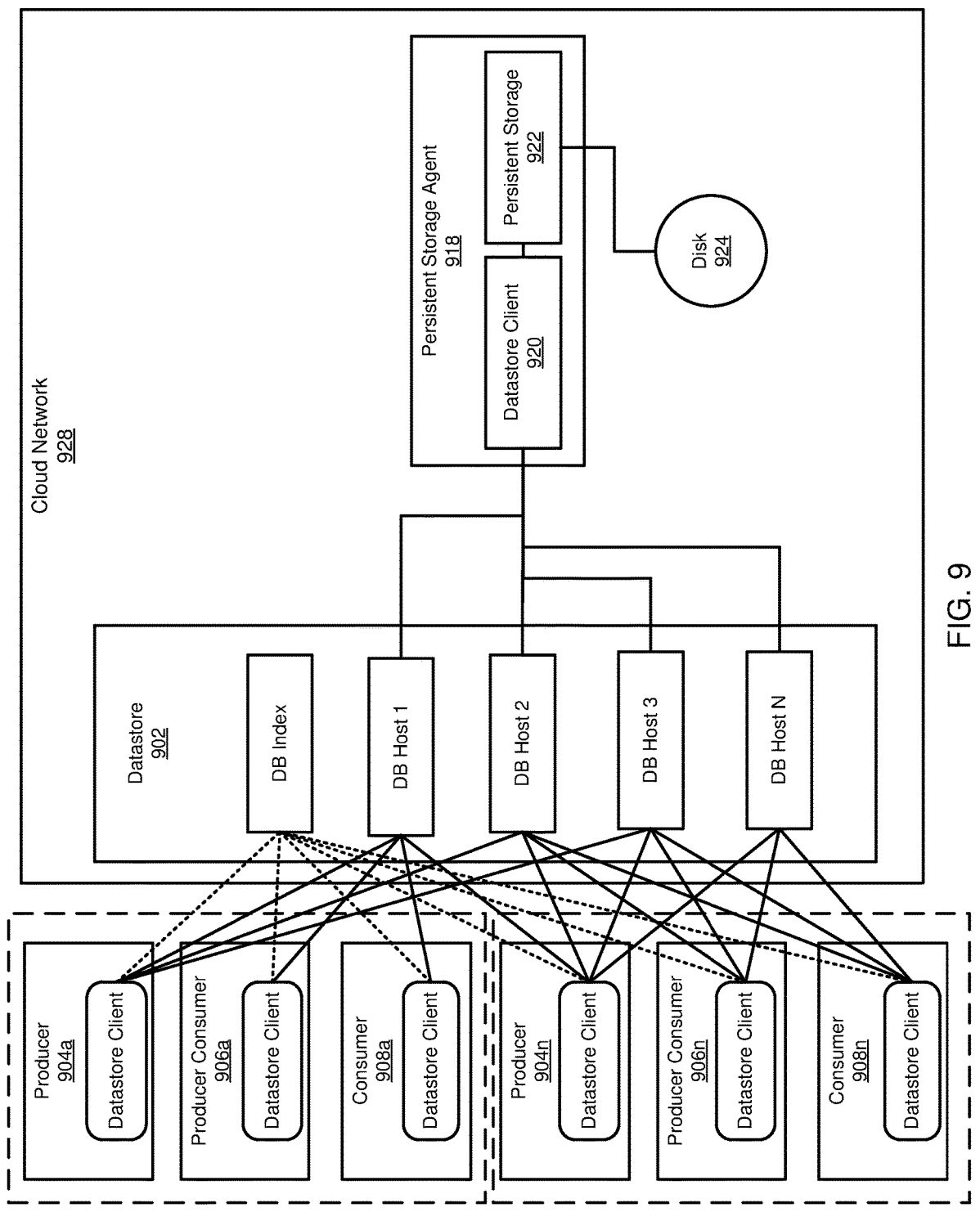
FIG. 9 is a schematic diagram of an embodiment of a cloud-based datastore.

FIG. 9 is a schematic diagram of an embodiment of a database cluster of a multiple node architecture for a datastore hosted in the cloud. The datastore 902 is in communication with producers 904a, 904n, producer consumers 906a, 906n, and consumers 908a, 908n from multiple devices. In the example implementation illustrated in FIG. 9, the datastore 902 is in communication with producers, producer consumers, and consumers from two separate devices. The datastore 902 includes a database index and multiple database hosts such as database host 1, database host 2, database host 3, and up thru database host n as illustrated. The datastore 902 may have any number of database hosts in various embodiments. The datastore 902 is in communication with a persistent storage agent 918. The persistent storage agent 918 is in communication with a datastore client 920 and includes persistent storage 922. The persistent storage agent 918 stores information in disk storage 924. All communication channels between producer 904a, 904n and database index, database host to N can be secured (authenticated and encrypted) via SSL or similar mechanism. This maintains privacy of data exchanged between the components.

The datastore 902 and the persistent storage agent 918 may be offloaded to a cloud network 928 to be stored in cloud-based storage. The datastore 902 and the data stored in the disk storage 924 may be accessed by multiple different devices. The datastore 902 may be made accessible to a client account by way of a datastore URL. The datastore 902 may be stored across one more deployments of cloud-based storage across one or more cloud networks 928. The datastore 902 may be accessible in multiple geographic locations. The datastore 902 may be also stored locally in networking devices or may be solely stored in cloud-based storage.

Figure 10:
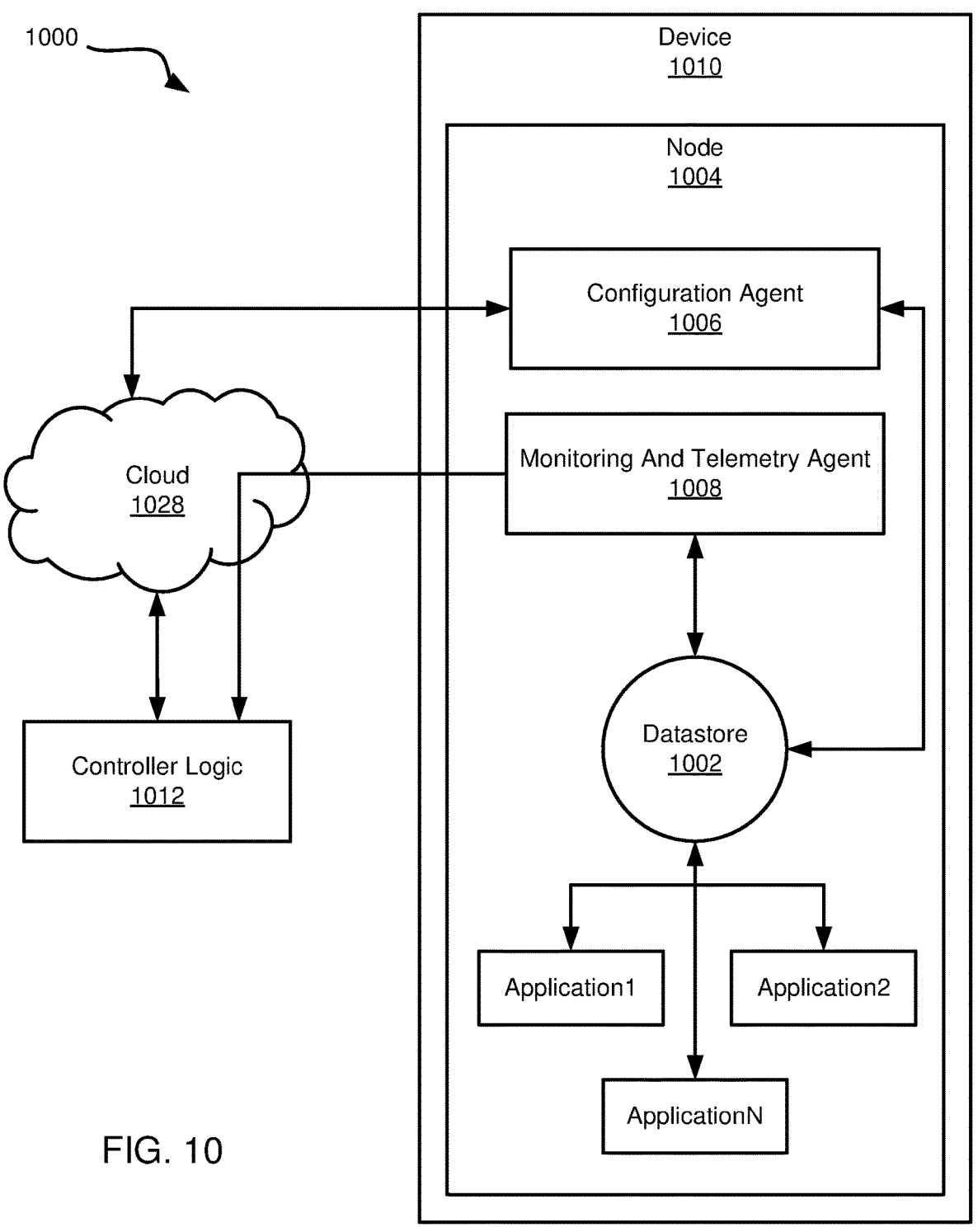
FIG. 10 is a schematic diagram of a system for offloading controller logic for a device to a cloud network.

FIG. 10 is a schematic diagram of system 1000 for communication between a node 1004 of a device 1010 and controller logic 1012 stored in a cloud network 1028. The device 1010 may be a switch 106 or a router 162 as discussed herein. The node 1004 includes a configuration agent 1006 and a monitoring/telemetry agent 1008. The device 1010 includes a datastore 1002. The datastore 1002 may be stored locally with the node 1004, may be stored in the device 1010 and made accessible to multiple nodes, may be offloaded to cloud storage, or may be stored externally and made accessible to multiple devices 1002. The configuration agent 1006 receives instructions in the form of controller logic 1012. The controller logic 1012 is stored in cloud-based storage on a cloud network and is made accessible to the device 1010 over a network. The configuration agent 1006 provides instructions to the monitoring/telemetry agent 1008. The monitoring/telemetry agent 1008 receives information from the datastore 1002. The datastore 1002 may include information for multiple applications such as application 1, application 2, and up thru application N as shown. All communication channels between configuration agent 1006 and controller logic 1012, and between monitoring and telemetry agent 1008 and controller logic 1012 can be secured (authenticated and encrypted) using SSL or similar such mechanism to maintain privacy of data exchanged amongst the components.

The configuration agent 1006 is responsible for managing configuration on a networking device. The configuration agent 1105 typically provides a command-line interface or NETCONF or RESTCONF or some other interface to configure and provision a networking device. Certain applications running on that networking device such as BGP or routing information base (RIB) may be notified of configuration changes by the configuration agent 1006. The configuration agent 1006 provides a mechanism where these applications can read the configuration and act accordingly.

The monitoring and telemetry agent 1008 subscribes to changes in a datastore and transmits those changes over a connection to an external entity such as a controller. The controller receives the telemetry data from multiple devices and may perform some analysis across devices and push back configuration updates to optimize the operations across devices. For illustration purposes, the telemetry may be similar simple network management protocol (SNMP), but instead of periodic polling, the monitoring and telemetry agent 1008 pushes updates to an external monitoring device.

The controller logic 1012 may alternatively be referred to as a controller. The controller logic 1012 manages multiple devices. The controller logic 1012 pushes configuration updates to the multiple devices and receives status information from the multiple devices by way of updates received from the monitoring and telemetry agent 1108. The controller logic 1012 can perform analysis such as a Best Path calculation across the route data from multiple devices and push appropriate results back to each device. This may provide improved overall network performance compared with each device performing its own best path calculation locally.

The applications are programs or services that perform operations based on the data in the datastore 1002. Example applications include Border Gateway Protocol (BGP), intermediate system to intermediate system (ISIS), routing information base (RIB), open shortest path first (OSPF), and so forth.

Figure 11:
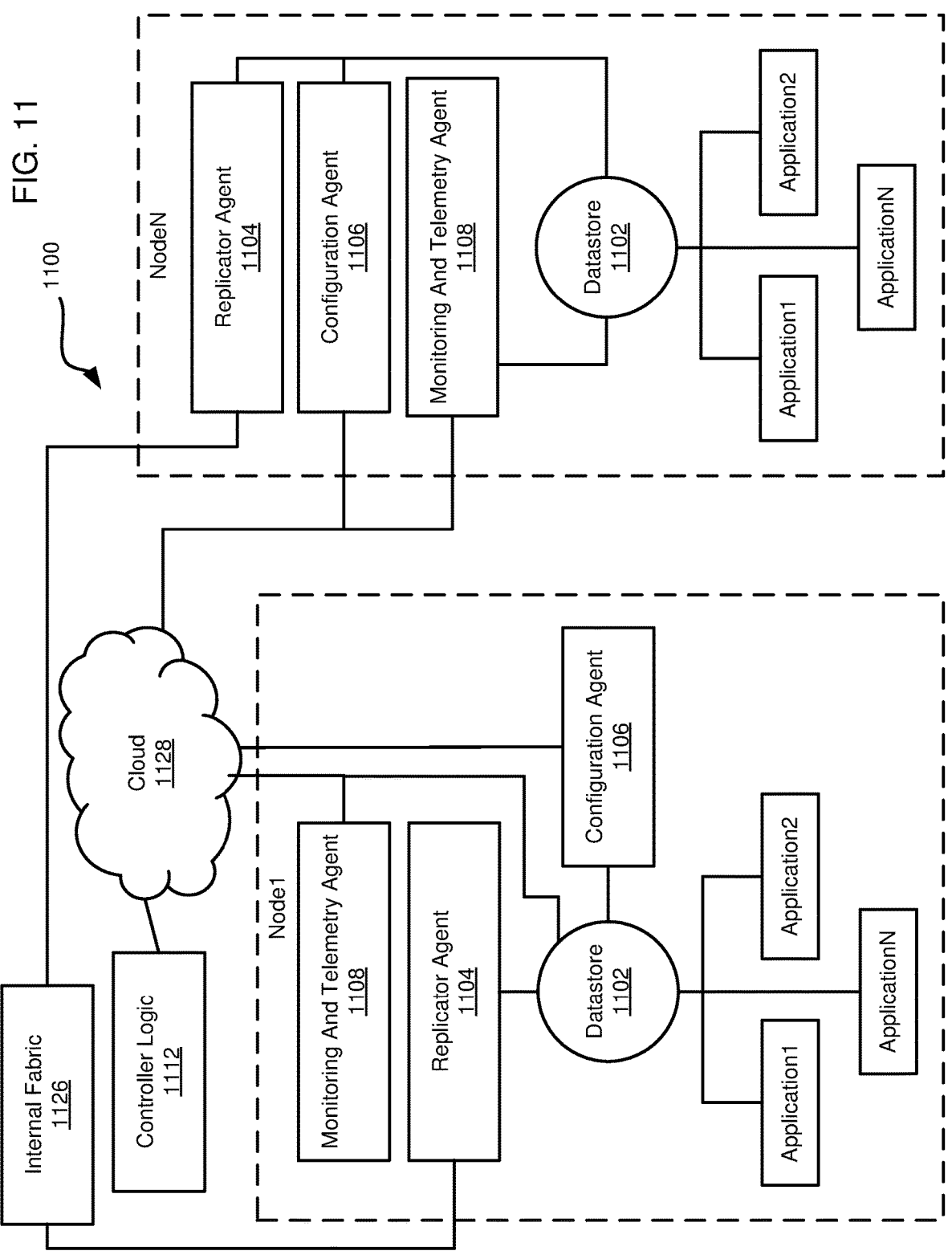
FIG. 11 is a schematic diagram of a system for offloading controller logic for a multiple node device to a cloud based controller.

FIG. 11 is a schematic diagram of a system for offloading controller logic for a multi-node device to a cloud based controller. The example architecture 1100 includes two nodes shown as discrete blocks Node1 and NodeN. It should be appreciated there may be any number of nodes suitable to different embodiments and implementations of the disclosure. Node1 includes a replicator agent 1104 in communication with the internal fabric 1126 that provides communication with the replicator agent 1104 of NodeN. The replicator agent 1104 is responsible for keeping data consistent between different instances of the datastore. The replicator agent 1104 replicates changes in one datastore to another datastore for redundancy or clustering purposes. The configuration agent 1106 of Node1 is in communication with the cloud 1128 network which includes the controller logic 1112 for the datastore 1102. Each of the nodes includes a copy of the datastore 1102. The information in the datastore 1102 may be accessed and used by multiple applications such as application1, application2, and up thru applicationN. The monitoring and telemetry agent 1108 of NodeN is in communication with the datastore 1102 and the cloud 1128 network. The configuration agent 1106 of Node1 can be in communication with the monitoring and telemetry agent 1108 of NodeN by way of the cloud 1128 network.

Figure 12:
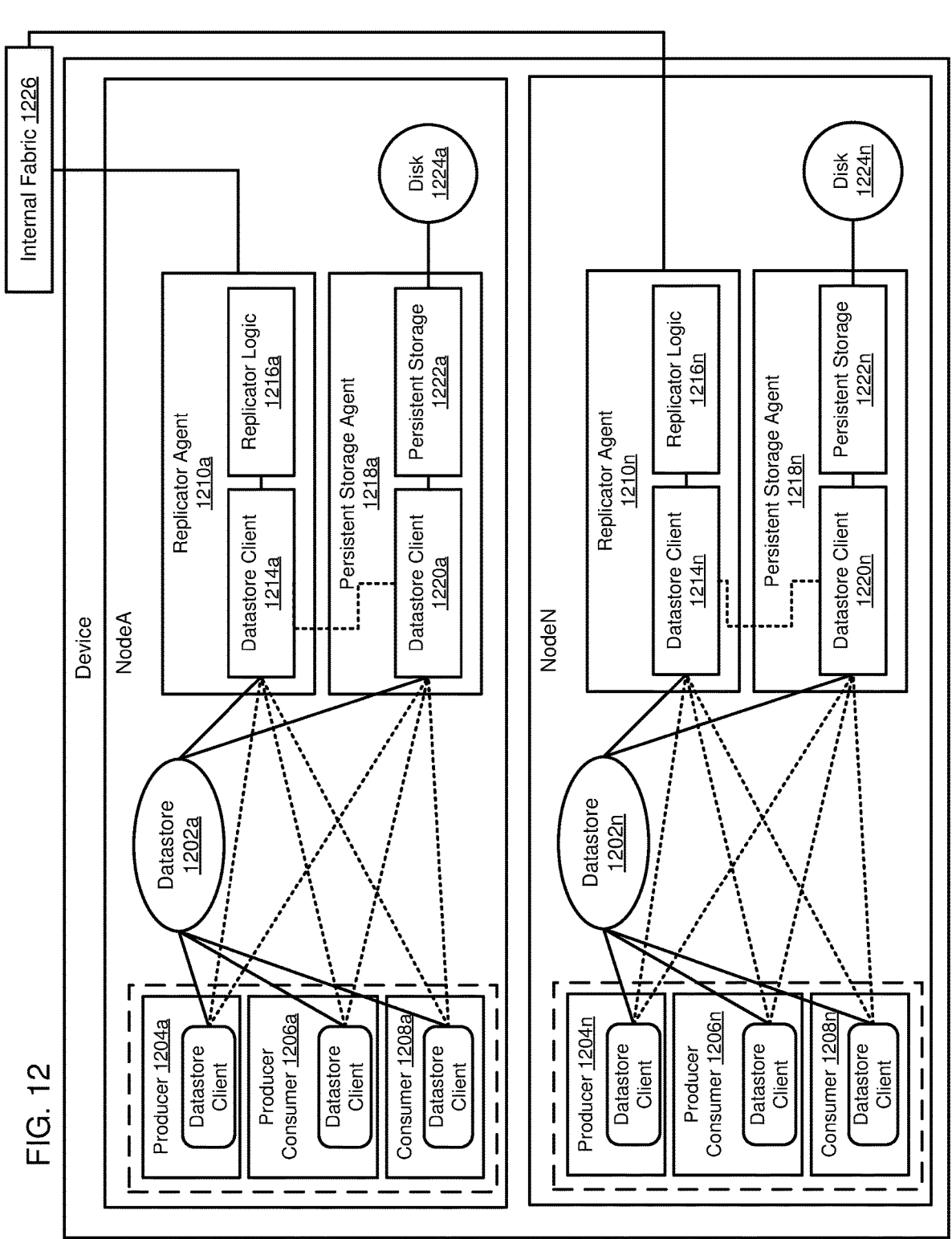
FIG. 12 is a schematic diagram of an inter-process communication (IPC) based datastore.

FIG. 12 is a schematic diagram of a direct inter-process communication (IPC) model of a datastore 1202. The inter-process communication channels are illustrated in dotted lines. The difference between the dotted lines (IPC) and the solid lines is that the IPC connections bypass the datastore. The IPC connections connect the datastore clients directly with each other and hence are one hop less than the solid lines which go via the datastore. The IPC channels exist between the datastore clients of the producer 1204, the producer consumer 1206, and the consumer 1208 with the datastore client 1214 of the replicator agent 1210 and the datastore client 1220 of the persistent storage agent 1218 as shown. Each of the nodes, including Node1 and NodeN maintains its own datastore 1202. Each node includes one or more producers 1204, producer consumers 1206, and consumers 1208. Each node includes a replicator agent 1210 including a datastore client 1214 and replicator logic 1216. Each node includes a persistent storage agent 1218 including a datastore client 1220 and persistent storage 1222 that offloads storage to disk 1224 storage.

Figure 13:
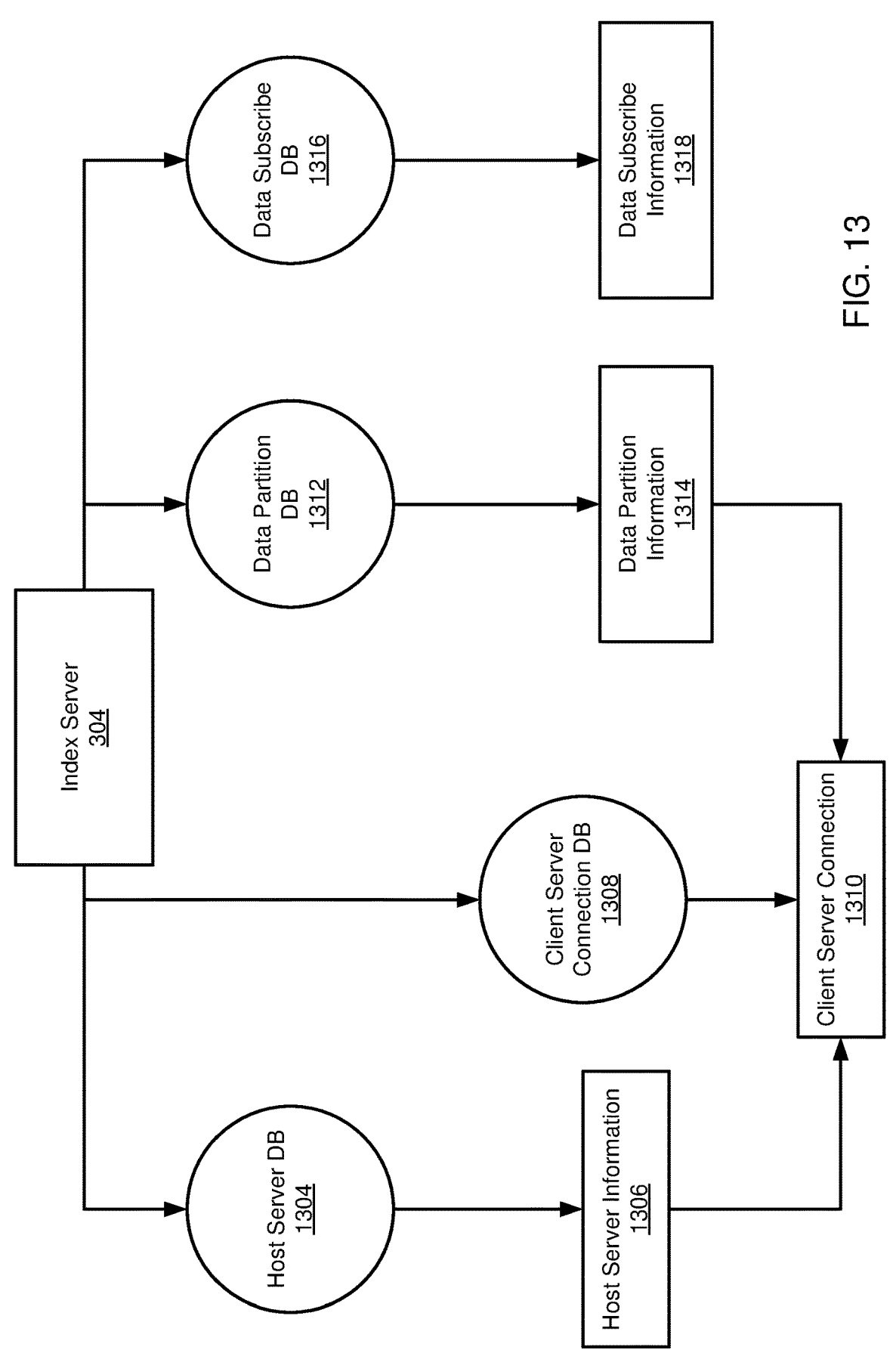
FIG. 13 is a schematic diagram of an index server of a datastore.

FIG. 13 is a schematic diagram of an index server 304 of a datastore. Embodiments of the datastore may include an index server 304 and a host server 310. The index server 304 may be used in conjunction with the datastore in single and multiple node embodiments. The index server 304 includes a host server database 1304 storing host server information 1306. The index server 304 includes a client server connection to database 1308 that facilitates a client server connection 1310. The index server 304 includes a data partition database 1312 that includes data partition information 1314. The index server 120 includes a data subscribe database 1316 that includes data subscribe information 1318.

The index server 304 manages datastore operations and queries. The index server 304 knows what information is anchored on which host device in the datastore. The datastore includes multiple host devices each serving as an execution node in an execution platform. Each host device may include one or more processors and cache memory. The index server 304 can read metadata to determine what information is already stored locally in cache memory in each of the multiple hosts. The index server 304 is configured to perform load balancing operations for each of the multiple host instances in the datastore.

Figure 14:
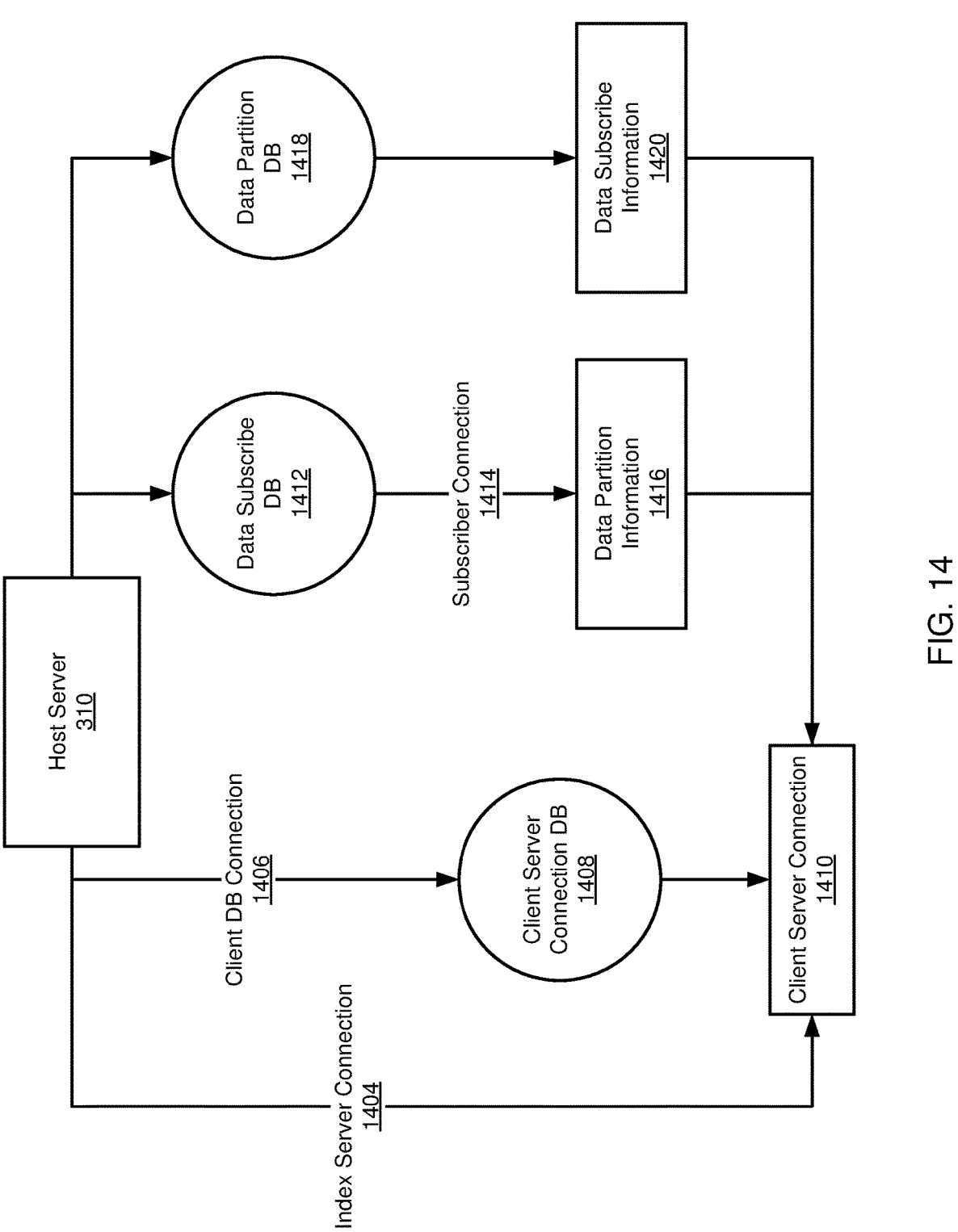
FIG. 14 is a schematic diagram of a host server of a datastore.

FIG. 14 is a schematic diagram of a host server 310 of a datastore. The host server may be used in conjunction with the datastore in single or multiple node architectures. The host server 310 facilitates an index server connection 1404 to a client server connection 1410 such that a client can access and query the datastore. The host server 310 facilitates a client database connection 1406 to generate a client server connection to the datastore 1408. The host server 310 includes a data subscribe database 1412 that facilitates a subscriber connection 1414 to access data partition information 1416. The host server 310 includes a data partition database 1418 that includes data subscribe information 1420.

The host server 310 provides connection to data within the datastore after an initial connection is established between a networking device and the datastore. The initial connection may be established by the index server 304. The host server 310 provides an indication of where data is within the data server. The host server 310 allows writing on the data stored in the datastore.

Figure 15:
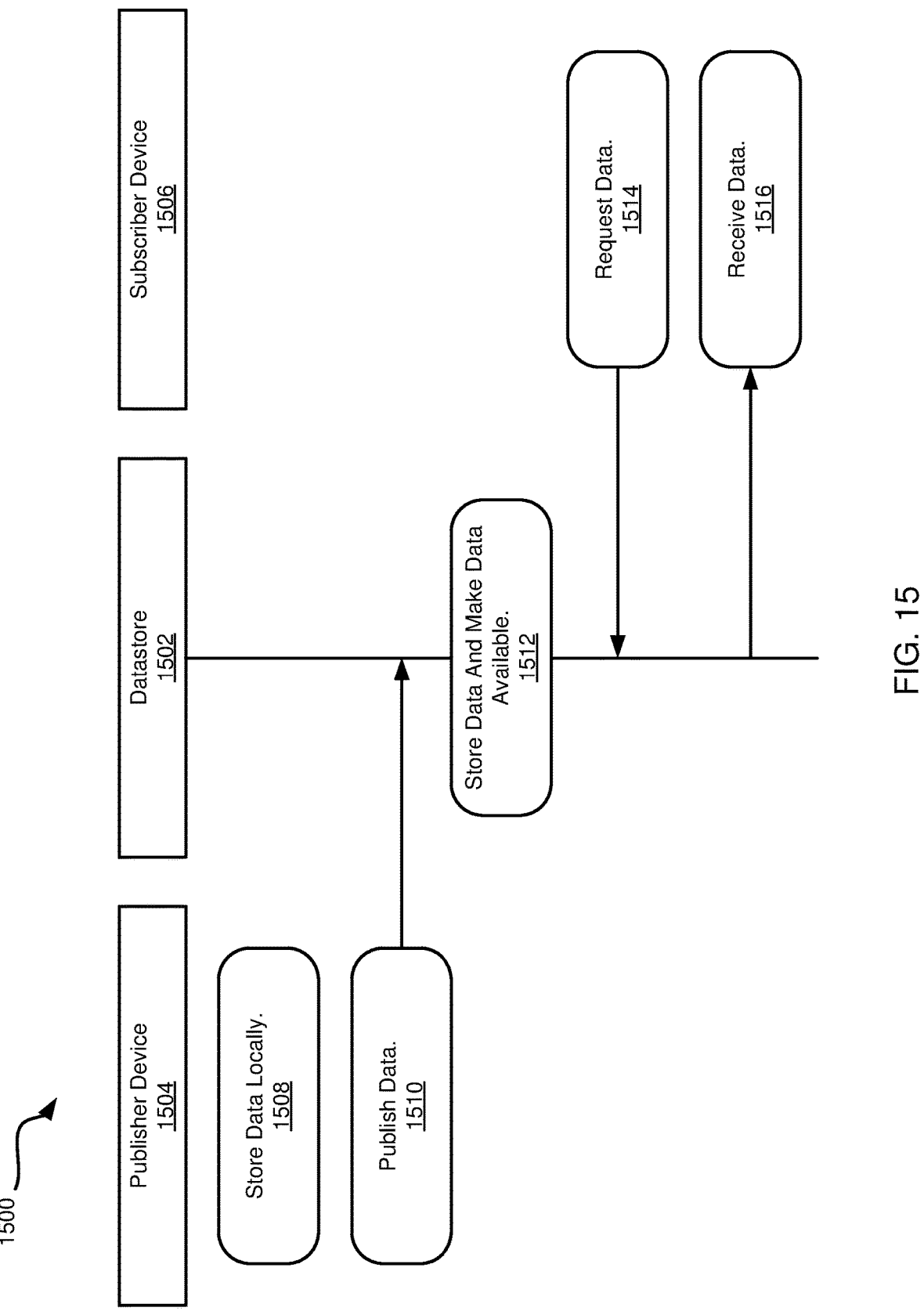
FIG. 15 is a schematic diagram of a process flow for publishing data to a datastore and providing published data to subscriber devices.

FIG. 15 is a schematic diagram of a process flow 1500 for data operations in a publish-subscribe datastore. The process flow 1500 may be implemented by a datastore 1502, a publisher device 1504, and a subscriber device 1506. Each of the publisher device 1504 and the subscriber device 1506 may be a BGP instance and/or a networking device such as a router or switch. The publisher device 1504 and the subscriber device 1506 may include some local storage and may be configured to offload large sums of data to the datastore 1502. A copy of at least a portion of the datastore 1502 may be stored locally in the publisher device 1504 and/or the subscriber device. The datastore 1502 may be stored in cloud-based storage and may be made accessible to the publisher device 1504 and/or the subscriber device 1506 by way of a network connection.

In the process flow 1500, the publisher device 1504 determines data to be stored and stores the data locally at 1508. The data may include, for example, state information for the device such as CPU utilization, temperature, fan speed, status of peripherals, and so forth. State information for the device can be useful to a monitoring agent and may be streamed out to other controllers or devices that want such information. The data may include best path information indicating the hops required to transmit data from a first location to a final destination. The best path information may be determined by the device locally according to the BGP. The best path information may be determined by a best path controller. The best path information may be published to the datastore such that it can be retrieved by all subscriber devices.

In the process flow, the publisher device 1504 publishes the data at 1510 to the datastore 1502. The datastore 1502 stores the data and makes the data available at 1512. The subscriber device 1506 may receive a notification from the datastore 1502 indicating the data is available. The subscriber device 1506 requests the data at 1514. The datastore 1502 queries the data stored within the datastore 1502 to provide a response to the subscriber device 1506. The subscriber device 1506 receives the data at 1516.

In an embodiment, the data is encrypted by the publisher device 1504 and/or the datastore 1502 and/or the subscriber device 1506. The datastore 1502 may encrypt the data and provide encrypted data to the subscriber device 1506. The datastore 1502 may perform authentications to ensure the subscriber device 1506 has permissions to read the data.

The process flow 1500 and the use of a datastore 1502 in a network computing environment enables numerous benefits. The datastore 1502 serves as an external database that stores replicated data for the devices. The datastore 1502 can be located externally to the devices. The datastore 1502 may receive an indication of all devices that are connected to the datastore 1502 and can receive and requests communications with the datastore 1502. This enables numerous benefits. The datastore 1502 can serve as a central agent that is aware of the state of all devices connected to the datastore 1502. The datastore 1502 can further serve as a central agent that knows what type of software, and what version of that software, is being run on each device in communication with the datastore 1502.

The data stored in the datastore 1502 can be used to restart operations in the event of a crash. If one or more devices fail due to an intermittent fault or a regression, the data in the datastore 1502 can be retrieved to resume operations as if the failure never occurred. The datastore 1502 serves as a backup for each of the devices in the datastore's 1502 network.

The information in the datastore 1502 can be provided to multiple subscriber devices 1506 at one time. This enables numerous benefits and prevents publisher devices 1504 from becoming backlogged by servicing information requests from subscriber devices 1506. For example, a computer network may include numerous devices and those devices may share best path information. In the example, the computer network includes three devices, device1, device2, and device 3. In an implementation, device1 and device2 each require information from device3. If device3 must respond to these requests, then the processing and storage resources device3 can be logged down with servicing requests. However, if the computer network includes a datastore 1502, device3 can instead publish the information to the datastore 1502, the datastore 1502 can store in the information, and the datastore 1502 can handle any requests for data from the other devices. This frees up processing and memory resources in each of the devices for performing higher priority operations to ensure smooth operation of data transmission throughout the computer network and into outside computer networks.

Figure 16:
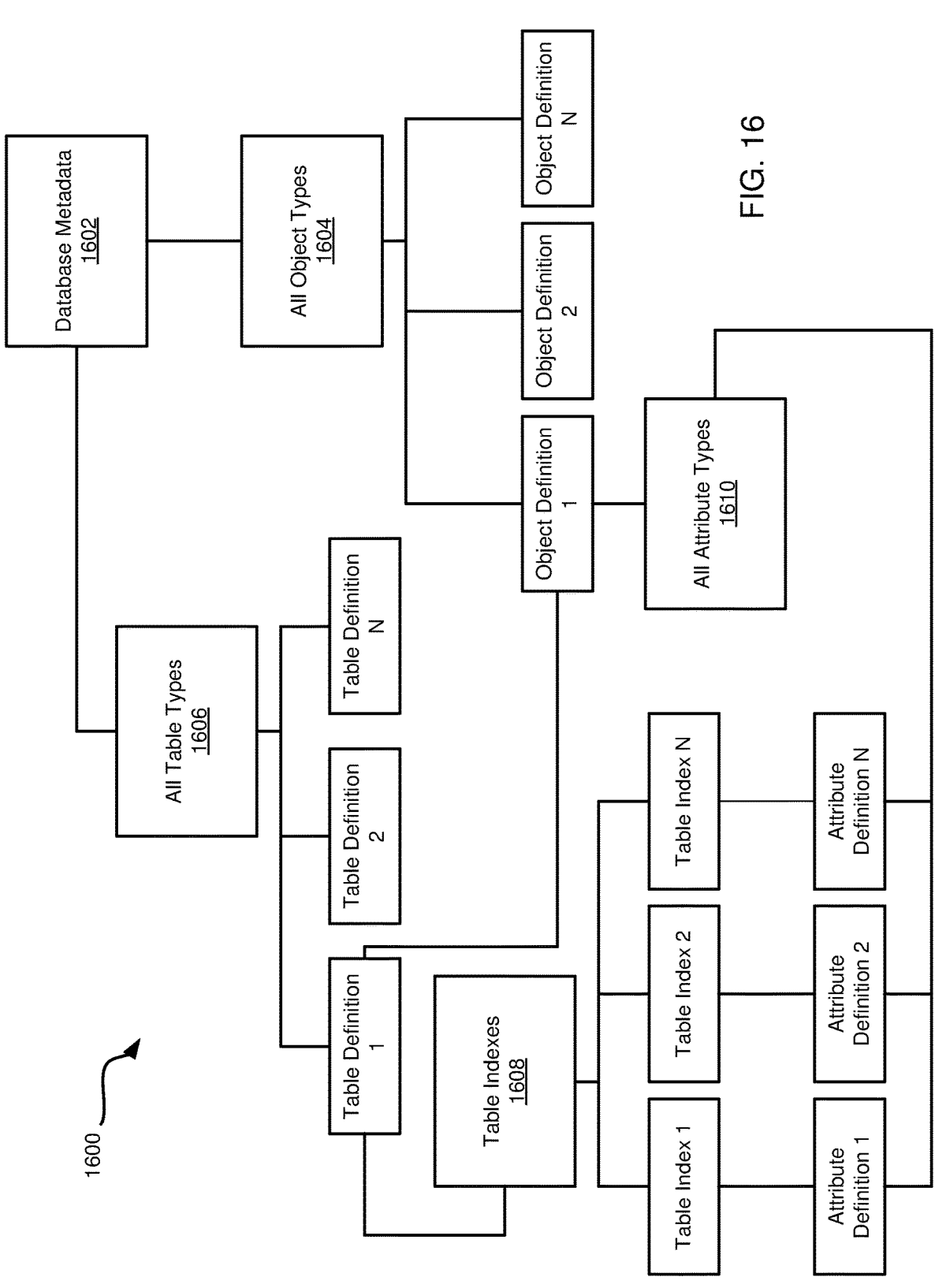
FIG. 16 is a schematic diagram of a storage structure for data stored within a datastore.

FIG. 16 is a schematic diagram of a storage structure 1600 for storing metadata on database content. The storage structure 1600 provides an exemplary embodiment of data storage in a datastore as discussed herein. The datastore may employ a user-defined data model via JSON (Java Script Object Notation) data schema definition standards. The data model may provide structure for tables, objects, and attributes in a hierarchical system. For example, the datastore may allow any application, including third party applications, to define a JSON-based data model and use APIs (application program interfaces) to produce and subscribe to data adhering to the same JSON-based data model.

The storage structure 1600 illustrated in FIG. 16 includes database metadata 1602 for all table types 1606 in the database and all object types 1604 in the database. The database metadata 1602 for the all table types 1606 includes table definitions such as table definition 1, table definition 2, and up thru table definition n as shown in FIG. 16. The table definitions can be defined by table indexes 1608. The database metadata 1052 may include a table index for each table definition such as table index 1, table index 2, and up thru table index n. Each of the table indexes may include an attribute definition such as attribute definition 1, attribute definition 2, and up thru attribute definition n. The database metadata 1602 for the all object types 1604 may include an object definition for each object in the database, such as object definition 1, object definition2, and up thru object definition n. The object definitions may further be associated with database metadata 1602 for all attribute types 1610.

In an embodiment, the datastore storage structure is specified by user-defined schema. The user-defined schema may be specified in JSON or in any other suitable language. In such an embodiment, the datastore can be fully customized to provide built in support for a multitude of datatypes for attributes, including array and sub objects. Further, this embodiment provides support for indexing objects under tables using indexing mechanisms. In an embodiment, the datastore can be stored in a JSON/XML format which may facilitate encapsulating the data in a REST (Representation State Transfer) and telemetry interface. The REST and telemetry interface may facilitate monitoring an analysis by a remote computing entity for determining the efficiency of the database. The data schema definition for the datastore may allow data to be provided from a REST/NETCONF interface in a manner that conforms to the data mode already defined for the data.

FIG. 17 is a schematic block diagram of a method 1700 for offloading storage of data from networking device to a datastore. The method 1700 can be performed by a datastore as discussed herein or any suitable computing device. The method 1700 may be performed by an index server 304 and/or a host server 310 of a datastore as discussed herein.

The method 1700 includes receiving at 1702, by a datastore in a network computing environment, data from a publisher device, wherein the datastore is independent of the publisher device. The method 1700 includes partitioning at 1704 the data into one or more database partitions according to database schema. The method 1700 includes storing at 1706 the data across one or more of a plurality of shared storage devices accessible by a plurality of hosts in a processing platform. The method 1700 includes receiving at 1708 a request for the data from a subscriber device, wherein the datastore is independent of the subscriber device. The method 1700 includes providing at 1710 the data to the subscriber device.

Figure 18:
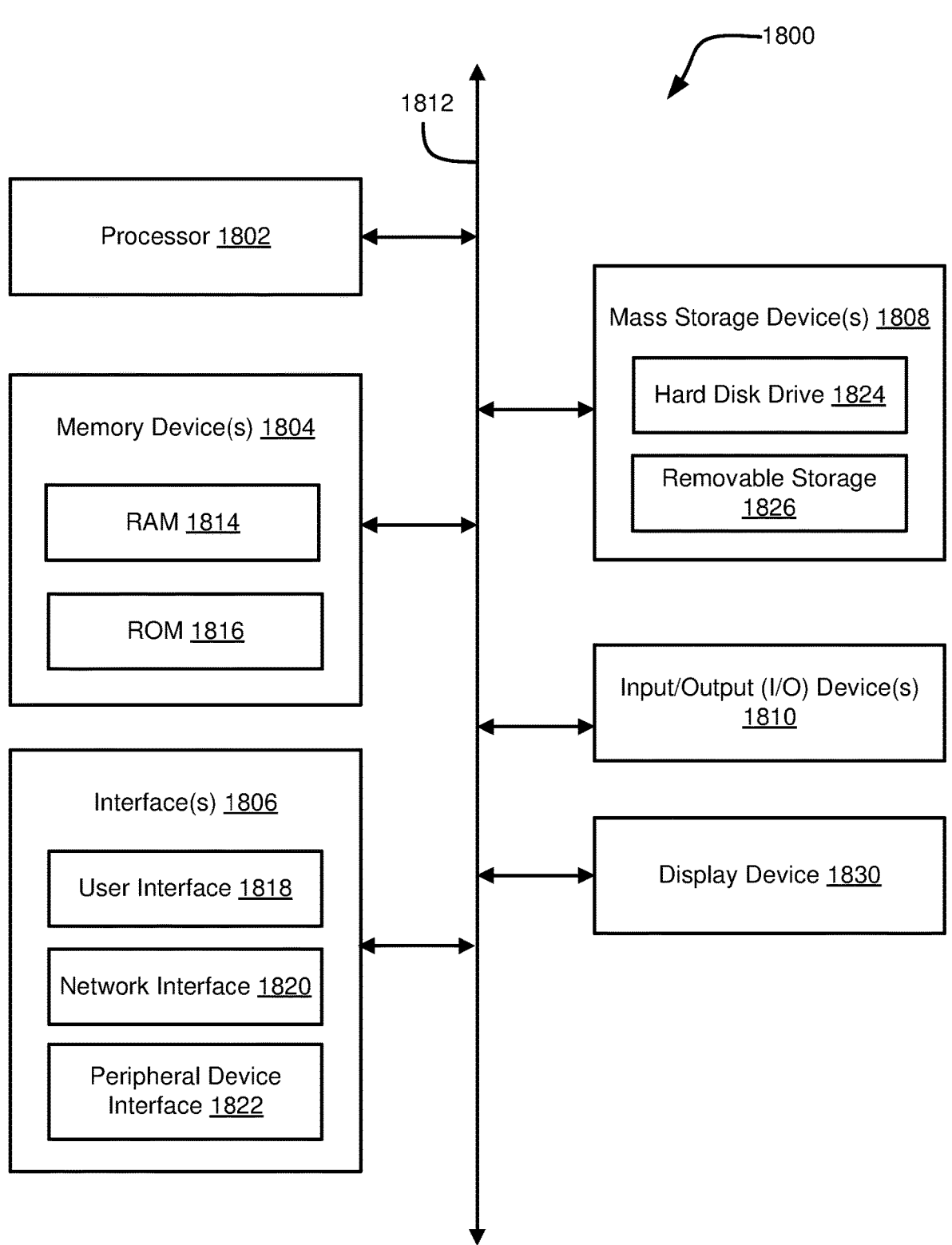
FIG. 18 is a schematic diagram illustrating components of an example computing device.

Referring now to FIG. 18, a block diagram of an example computing device 1800 is illustrated. Computing device 1800 may be used to perform various procedures, such as those discussed herein. In one embodiment, the computing device 1800 can function as a datastore, including an index server 304 and/or a host server 310. Computing device 1800 can perform various monitoring functions as discussed herein, and can execute one or more application programs, such as the application programs or functionality described herein. Computing device 1800 can be any of a wide variety of computing devices, such as a desktop computer, in-dash computer, vehicle control system, a notebook computer, a server computer, a handheld computer, tablet computer and the like.

Computing device 1800 includes one or more processor(s) 1802, one or more memory device(s) 1804, one or more interface(s) 1806, one or more mass storage device(s) 1808, one or more Input/output (I/O) device(s) 1802, and a display device 1830 all of which are coupled to a bus 1812. Processor(s) 1802 include one or more processors or controllers that execute instructions stored in memory device(s) 1804 and/or mass storage device(s) 1808. Processor(s) 1802 may also include various types of computer-readable media, such as cache memory.

Memory device(s) 1804 include various computer-readable media, such as volatile memory (e.g., random access memory (RAM) 1814) and/or nonvolatile memory (e.g., read-only memory (ROM) 1816). Memory device(s) 1804 may also include rewritable ROM, such as Flash memory.

Mass storage device(s) 1808 include various computer readable media, such as magnetic tapes, magnetic disks, optical disks, solid-state memory (e.g., Flash memory), and so forth. As shown in FIG. 18, a particular mass storage device is a hard disk drive 1824. Various drives may also be included in mass storage device(s) 1808 to enable reading from and/or writing to the various computer readable media. Mass storage device(s) 1808 include removable media 1826 and/or non-removable media.

Input/output (I/O) device(s) 1802 include various devices that allow data and/or other information to be input to or retrieved from computing device 1800. Example I/O device(s) 1802 include cursor control devices, keyboards, keypads, microphones, monitors or other display devices, speakers, printers, network interface cards, modems, and the like.

Display device 1830 includes any type of device capable of displaying information to one or more users of computing device 1800. Examples of display device 1830 include a monitor, display terminal, video projection device, and the like.

Interface(s) 1806 include various interfaces that allow computing device 1800 to interact with other systems, devices, or computing environments. Example interface(s) 1806 may include any number of different network interfaces 1820, such as interfaces to local area networks (LANs), wide area networks (WANs), wireless networks, and the Internet. Other interface(s) include user interface 1818 and peripheral device interface 1822. The interface(s) 1806 may also include one or more user interface elements 1818. The interface(s) 1806 may also include one or more peripheral interfaces such as interfaces for printers, pointing devices (mice, track pad, or any suitable user interface now known to those of ordinary skill in the field, or later discovered), keyboards, and the like.

Bus 1812 allows processor(s) 1802, memory device(s) 1804, interface(s) 1806, mass storage device(s) 1808, and I/O device(s) 1802 to communicate with one another, as well as other devices or components coupled to bus 1812. Bus 1812 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1800 and are executed by processor(s) 1802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, if any, any future claims submitted here and in different applications, and their equivalents.

EXAMPLES

The following examples pertain to further embodiments.

Example 1 is a system. The system includes a publisher device in a network computing environment. The system includes a subscriber device in the network computing environment. The system includes a datastore independent of the publisher device and the subscriber device, the datastore comprising one or more processors in a processing platform configurable to execute instructions stored in non-transitory computer readable storage media. The instructions includes receiving data from the publisher device. The instructions include storing the data across one or more of a plurality of shared storage devices. The instructions include providing the data to the subscriber device.

Example 2 is a system as in Example 1, wherein the datastore further comprises: an index server for receiving data processing requests from a plurality of subscriber devices; metadata accessible to the index server; a host server in communication with the processing platform; and a plurality of shared storage devices collectively storing a plurality of datapoints received from a plurality of connected publisher devices.

Example 3 is a system as in any of Examples 1-2, wherein the instructions further comprise partitioning the data into one or more database partitions according to database schema.

Example 4 is a system as in any of Examples 1-3, wherein one or more of: the publisher device is a switch or router; and the data comprises one or more of state information for the publisher device or best path information determined by the publisher device.

Example 5 is a system as in any of Examples 1-4, wherein the instructions further comprise offloading the data to cloud-based storage, and wherein the datastore itself is a cloud-based database instance.

Example 6 is a system as in any of Examples 1-5, wherein a copy of at least a portion of a plurality of datapoints stored by the datastore are stored in one or more of the publisher device or the subscriber device.

Example 7 is a system as in any of Examples 1-6, wherein the instructions further comprise generating metadata for the data as the data is ingested into the datastore.

Example 8 is a system as in any of Examples 1-7, wherein the instructions further comprise receiving an indication from at least one of the publisher device or the subscriber device by way of an application program interface (API), wherein instructions for the API are stored in the datastore.

Example 9 is a system as in any of Examples 1-8, wherein the data is a best path determination, and wherein the datastore processes the best path determination in lieu of the publisher device itself publishing the best path determination to one or more subscriber devices.

Example 10 is a system as in any of Examples 1-9, wherein the instructions further comprise identifying all devices connected to the datastore for publishing or subscribing data managed by the datastore.

Example 11 is one or more processors configurable to execute instructions stored in non-transitory computer readable storage media. The instructions include receiving, by a datastore in a network computing environment, data from a publisher device, wherein the datastore is independent of the publisher device. The instructions include partitioning the data into one or more database partitions according to database schema. The instructions include storing the data. The instructions include receiving a request for the data from a subscriber device, wherein the datastore is independent of the subscriber device. The instructions include providing the data to the subscriber device.

Example 12 is one or more processors of as in Example 11, wherein one or more of: the publisher device is a switch or router; and the data comprises one or more of state information for the publisher device or best path information determined by the publisher device.

Example 13 is one or more processors as in any of Examples 11-12, wherein the instructions further comprise offloading the data to cloud-based storage, and wherein the datastore itself is a cloud-based database instance.

Example 14 is one or more processors as in any of Examples 11-13, wherein the instructions further comprise generating metadata for the data as the data is ingested into the datastore.

Example 15 is one or more processors as in any of Examples 11-14, wherein the instructions further comprise receiving an indication from at least one of the publisher device or the subscriber device by way of an application program interface (API), wherein instructions for the API are stored in the datastore.

Example 16 is a method. The method includes receiving, by a datastore in a network computing environment, data from a publisher device, wherein the datastore is independent of the publisher device. The method includes partitioning the data into one or more database partitions according to database schema. The method includes storing the data. The method includes receiving a request for the data from a subscriber device, wherein the datastore is independent of the subscriber device. The method includes providing the data to the subscriber device.

Example 17 is a method as in Example 16, wherein one or more of: the publisher device is a switch or router; and the data comprises one or more of state information for the publisher device or best path information determined by the publisher device.

Example 18 is a method as in any of Examples 16-17, wherein the datastore comprises: an index server for receiving data processing requests from a plurality of subscriber devices; metadata accessible to the index server; a host server in communication with the processing platform; and a plurality of shared storage devices collectively storing a plurality of datapoints received from a plurality of connected publisher devices.

Example 19 is a method as in any of Examples 16-18, wherein the data is a best path determination, and wherein the datastore processes the best path determination in lieu of the publisher device itself publishing the best path determination to one or more subscriber devices.

Example 20 is a method as in any of Examples 16-19, further comprising identifying all devices connected to the datastore for publishing or subscribing data managed by the datastore.

It is to be understood that any features of the above-described arrangements, examples, and embodiments may be combined in a single embodiment comprising a combination of features taken from any of the disclosed arrangements, examples, and embodiments.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system comprising:

a publisher device in a network computing environment, the publisher device being a switch or router and executing a first border gateway protocol (BGP) instance;

a subscriber device in the network computing environment; and a datastore independent of the publisher device and the subscriber device, the datastore comprising one or more processors in a processing platform configurable to execute instructions stored in non-transitory computer readable storage media, the non-transitory computer readable storage media storing instructions that, when executed by the one or more processors, causes the one or more processors to perform a method comprising:

receiving data from the publisher device, the data comprising one or more of state information for the publisher device or best path information determined by the publisher device;

storing the data across one or more of a plurality of shared storage devices by storing the one or more of the state information for the publisher device or the best path information in a database in the datastore, the one or more of the state information for the publisher device or the best path information being partitioned according to a database schema; and providing the data to the subscriber device;

wherein the publisher device is configured to not locally store the state information for the publisher device or the best path information.

2. The system of claim 1, wherein:

the data comprises paths learned by the publisher device for a prefix; and the instructions, when executed by the one or more processors, further cause the one or more processors to determine a best path from among the paths and return the best path to the publisher device.

3. The system of claim 2, wherein the subscriber device is configured to retrieve the best path from the datastore.

4. The system of claim 2, wherein the publisher device is configured to advertise the best path to one or more neighbors in the network computing environment.

5. The system of claim 2, wherein the publisher device is a BGP route reflector.

6. The system of claim 1, wherein the subscriber device executes a second BGP instance.

7. The system of claim 1, wherein the subscriber device executes at least one of system to intermediate system (ISIS) routing, a routing information base (RIB), and open shortest path first (OSPF).

8. The system of claim 1, wherein:

the data comprises paths learned by the publisher device for a prefix; and the instructions, when executed by the one or more processors, further causes the one or more processors to modify a next-hop of one or more of the paths.

9. The system of claim 1, wherein the method further comprises offloading the data to cloud-based storage, and wherein the datastore itself is a cloud-based database instance.

10. The system of claim 1, wherein a copy of at least a portion of the datastore is stored in the publisher device.

11. The system of claim 1, wherein the publisher device is configured to communicate directly with the subscriber device by way of inter-process communication (IPC).

12. A method comprising:

executing, by a publisher device in a network computing environment, a first border gateway protocol (BGP) instance, the publisher device being a switch or router;

receiving, by a controller device, data from the publisher device, the data comprising one or more of state information for the publisher device or best path information determined by the publisher device, the publisher device not locally storing the state information for the publisher device or the best path information;

storing, by the controller device, the data in a datastore across one or more of a plurality of shared storage devices by storing the one or more of the state information for the publisher device or the best path information in a database in the datastore, the one or more of the state information for the publisher device or the best path information being partitioned according to a database schema; and providing, by the controller device, the data to a subscriber device in the network computing environment.

13. Method of claim 12, wherein:

the data comprises paths learned by the publisher device for a prefix; and the method further comprises:

determining, by the controller device, a best path from among the paths; and returning, by the controller device, the best path to the publisher device.

14. The method of claim 13, further comprising retrieving, by the subscriber device, the best path from the datastore.

15. The method of claim 13, further comprising advertising, by the publisher device, the best path to one or more neighbors in the network computing environment.

16. The method of claim 13, wherein the publisher device is a BGP route reflector.

17. The method of claim 12, wherein the subscriber device executes a second BGP instance.

18. The method of claim 12, wherein the subscriber device executes at least one of system to intermediate system (ISIS) routing, a routing information base (RIB), and open shortest path first (OSPF).

19. The method of claim 12, wherein:

the data comprises paths learned by the publisher device for a prefix; and the method further comprises modifying, by the controller device, a next-hop of one or more of the paths.

20. The method of claim 12, further comprising offloading, by the controller device, the data to cloud-based storage, and wherein the datastore itself is a cloud-based database instance.

* * * * *